(12) United States Patent
Strassenburg-Kleciak et al.

(10) Patent No.: US 7,643,669 B2
(45) Date of Patent: Jan. 5, 2010

(54) SYSTEM FOR GENERATING THREE-DIMENSIONAL ELECTRONIC MODELS OF OBJECTS

(75) Inventors: Marek Strassenburg-Kleciak, Hamburg (DE); Philipp Harald Nagel, Seevetal (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 538 days.

(21) Appl. No.: 10/519,252

(22) PCT Filed: Jun. 30, 2003

(86) PCT No.: PCT/US03/20225

§ 371 (c)(1),
(2), (4) Date: Nov. 21, 2005

(87) PCT Pub. No.: WO2004/006181

PCT Pub. Date: Jan. 15, 2004

(65) Prior Publication Data

US 2006/0110026 A1    May 25, 2006

Related U.S. Application Data

(60) Provisional application No. 60/395,165, filed on Jul. 10, 2002.

(51) Int. Cl.
*G06K 9/00* (2006.01)
(52) U.S. Cl. ............... 382/154; 382/284; 345/419; 701/213

(58) Field of Classification Search ............. 382/154, 382/195, 284, 100; 364/449, 455, 456, 457, 364/460; 340/990, 995, 17; 345/7, 11, 23, 345/27, 419; 395/119, 124, 125, 127, 129; 700/98, 97, 118; 701/213
See application file for complete search history.

(56) References Cited

U.S. PATENT DOCUMENTS 5,194,969 A    3/1993   DiFrancesco .......... 358/463
5,471,572 A   11/1995   Buchner et al. ........ 395/139

(Continued)

FOREIGN PATENT DOCUMENTS

DE    199 48 544 A1    5/2001

(Continued)

OTHER PUBLICATIONS

International Application No. PCT/US03/20225, filed Jun. 30, 2003, International Search Report.

(Continued)

*Primary Examiner*—Sheela C Chawan
(74) *Attorney, Agent, or Firm*—Brinks Hofer Gilson and Lione

(57) ABSTRACT

An image generation system for developing three-dimensional electronic models of objects includes a scanner and a computing system. The scanner may be selectively positioned adjacent to an object in different geographic positions. The scanner may provide scanner position information and image data representative of the object to the computing system. The computing system may generate a three-dimensional electronic model of the object from the image data and the scanner position information. The three-dimensional electronic model may be stored and utilized in other applications, such as an electronic navigational map.

58 Claims, 19 Drawing Sheets

U.S. PATENT DOCUMENTS

| | | | | |
|---|---|---|---|---|
| 5,566,073 | A | * | 10/1996 | Margolin .................... 701/213 |
| 5,802,361 | A | | 9/1998 | Wang et al. ................. 395/600 |
| 5,988,862 | A | * | 11/1999 | Kacyra et al. ................. 703/6 |
| 6,169,516 | B1 | | 1/2001 | Watanabe et al. |
| 6,246,468 | B1 | | 6/2001 | Dimsdale |
| 6,285,373 | B1 | | 9/2001 | Baldwin et al. ............. 345/430 |
| 6,522,336 | B1 | | 2/2003 | Yuasa |
| 6,600,553 | B1 | | 7/2003 | Stone |
| 7,218,318 | B2 | | 5/2007 | Shimazu .................... 345/419 |
| 2001/0048443 | A1 | | 12/2001 | Burrell |
| 2001/0056308 | A1 | * | 12/2001 | Petrov et al. .................. 700/98 |
| 2002/0044086 | A1 | | 4/2002 | Boman ................. 342/357.08 |
| 2003/0021343 | A1 | | 1/2003 | Trovato ................. 375/240.08 |
| 2006/0087505 | A1 | | 4/2006 | Dumesny et al. ............ 345/419 |
| 2006/0152522 | A1 | | 7/2006 | Strassenburg-Kleciak et al. .......................... 345/582 |
| 2006/0188143 | A1 | | 8/2006 | Strassenburg-Kleciak ... 382/154 |

FOREIGN PATENT DOCUMENTS

| | | |
|---|---|---|
| JP | 03-078095 | 4/1991 |
| JP | 08-159762 | 6/1996 |
| JP | 09-102029 | 4/1997 |
| JP | 10-091760 | 4/1998 |
| JP | 10-207351 | 8/1998 |
| JP | 10-275246 | 10/1998 |
| JP | 11-120374 | 4/1999 |
| JP | 11-175759 | 7/1999 |
| JP | 2000-020735 | 1/2000 |
| JP | 2000-509150 | 7/2000 |
| JP | 2000-331019 | 11/2000 |
| JP | 2001-043394 | 2/2001 |
| JP | 2001-117962 A2 | 4/2001 |
| JP | 2001-0117963 A2 | 4/2001 |
| JP | 2001-325619 | 11/2001 |
| WO | WO 97/40342 | 10/1997 |
| WO | WO 01/31290 A2 | 5/2001 |

OTHER PUBLICATIONS

*Study on Making City Model With Image and Laser Range Data*, Masafumi Nakagawa and Ryosuke Shibasaki, 22nd Asian Conference on Remote Sensing, Nov. 5-9, 2001.

Steven Elliot et al., "Inside 3D Studio Max 2.5 Top", Japan, Softbank Co., Ltd., Oct. 6, 1998, 1st Edition, p. 491-494.

"Adobe Photoshop 5.0 User Guide," Photoshop Incorporated, XP-002522158, Dec. 31, 1998, p. 347-358.

Elliot, Steven, et al., "Inside 3D Studio MAX 2.5 Top," Japan, Softbank Co., Ltd., Oct. 6, 1998 1st Edition, p. 491-494, with attached concise statement of relevance (5 pgs).

Japanese Office Action from Japanese Application No. 2004-51656, dated Jul. 10, 2009 (6 pgs.).

* cited by examiner

SYSTEM FOR GENERATING THREE-DIMENSIONAL ELECTRONIC MODELS OF OBJECTS

PRIORITY CLAIM

This application claims the benefit of U.S. Provisional Application No. 60/395,165 filed on Jul. 10, 2002. In addition, the following commonly owned patent applications are related to this application: U.S. patent application Ser. No. 10/519,223, filed Nov. 21, 2005, entitled SYSTEM FOR TEXTURIZING ELECTRONIC REPRESENTATIONS OF OBJECTS, and U.S. patent application Ser. No. 11/284,803, filed Nov. 22, 2005, entitled SCANNING SYSTEM FOR THREE-DIMENSIONAL OBJECTS.

COPYRIGHT NOTICE REFERENCE

A portion of this disclosure contains material that is subject to copyright protection. The copyright owner has no objection to the facsimile reproduction by anyone of this disclosure, as it appears in the Patent and Trademark Office patent file or records, but otherwise reserves all copyright rights.

BACKGROUND OF THE INVENTION

1. Technical Field

The invention generally relates to an electronic representation of an object, and more particularly, to a system for generating models of three-dimensional objects in an electronic form.

2. Related Art

Navigational maps may be displayed in an electronic form. Some navigational maps are electronically displayed in two-dimensions. As such, a user of a navigational map may have difficulty in orienting himself to a location on the display. Navigational maps displaying objects in three dimensions may overcome these drawbacks by displaying objects as a user would observe them in the surrounding environment.

Three-dimensional electronic representations of an object may be created using a digital camera. Another technique uses artists to manually create three-dimensional views of objects. Still another technique uses lasers. With the laser technique, a laser beam is reflected off an object to measure distances. The distances may be used to map the shape of an object and create an electronic representation. Existing laser techniques measure distance from reference points, such as metal targets that must be installed on the object. The targets may therefore be included in multiple scans of the object. The multiple scans may be manually combined into a three-dimensional representation using the targets. Known laser techniques generate only geometric shapes of objects.

In electronic navigational maps, accurate electronic representations of large multi-structural objects, such as office complexes or shopping malls may provide a bearing for one's surroundings. Visual details and other features of large objects may be needed for a user to accurately compare a displayed object to an observed surrounding. Unfortunately, electronic representations with a digital camera requires manually combining multiple electronic images that still may not provide sufficient visual details and features. Electronic representations created manually by an artist may be inaccurate, time-consuming, and costly, and may undesirably add significant data to the electronic navigational maps. Further, electronic representations with lasers require reference points on large objects that may be difficult to install and/or maintain while scanning the object. There are therefore technical problems related to accurately and efficiently creating an electronic model representative of a large object. In addition, there are technical problems related to techniques to convert each of multiple scans into a three-dimensional representation of the object.

Therefore, a need exists for systems for generating electronic representations of three-dimensional objects for use in navigational maps or other systems that overcome the shortcomings of the prior art.

SUMMARY

This invention provides an image generation system capable of generating electronic representations of three-dimensional objects in an electronic model. The three-dimensional electronic model of an object may be utilized in applications, such as navigational maps. Such objects may include, for example, office buildings, hospitals, houses, bridges, statues, vegetation and/or any other natural or man made landmarks.

The image generation system includes a scanner and a computing system. The scanner may be positioned at different geographic locations around an object to perform separate scans. The data collected during each of the scans may be provided to the computing system. Using the scan data, the computing system may generate a three-dimensional electronic model. The three-dimensional electronic model may be a scaled, colored, texturized model visually representative of the object.

The scanner may include a point scanner, a color scanner and a positioning system. The point scanner may be used to determine geometric points representative of the geometric shape of the object. The color scanner may operate synchronously with the point scanner to determine color points representative of the color of the object. The positioning system may determine position information in the form of navigation coordinates (e.g., longitude and latitude), the height of the scanner, the slope and the orientation of the scanner.

The geometric points, color points and position information from each scan may be associated to form three-dimensional electronic images. Within each of the three-dimensional electronic images, the geometric points may be joined to form surfaces or lines. In addition, the three-dimensional electronic images may be combined by the computing system using the position information to form a three-dimensional electronic model. Manipulation by translation and rotation of the three-dimensional electronic images with respect to each other may be performed during the combination process. Accordingly, an object of any shape and/or size may be scanned and the individual scans may be combined to form a three-dimensional electronic model in the geometric shape of the object.

The computing system may also texturize the surfaces of the three-dimensional electronic model. Texturization involves adding electronic representation of the features visually perceived on one or more surfaces of the object to the three-dimensional electronic model. The texturization process involves identifying an image file such as an electronic photograph of the object as a source texture. The source texture may be assigned a unique identifier and stored in a library. In addition, the source texture may be associated with one or more surfaces of the three-dimensional electronic model. Further, the source texture may be used to form a complex texture.

The source texture may be transformed to form at least a part of the complex texture. Transformation of the source texture may involve creating a transformation procedure that includes the unique identifier of the source texture. The transformation procedure may be associated with one or more surfaces of the three-dimensional electronic object. When the three-dimensional object is displayed, the transformation procedure(s) may be executed to generate the complex texture(s) from the source texture(s). Accordingly, only the source texture and the transformation procedures need to be associated with the surfaces of the three-dimensional electronic model.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

The invention provides an image generation system capable of developing texturized three-dimensional electronic models that represent objects. Once generated, the electronic models may be used in many applications, including navigational maps. The terms "electronic representation", "electronic form", "electronic model" and "electronic image" should be broadly construed to include any form of digital data that may be captured, manipulated, stored and displayed visually such as, a data file.

Figure 1:
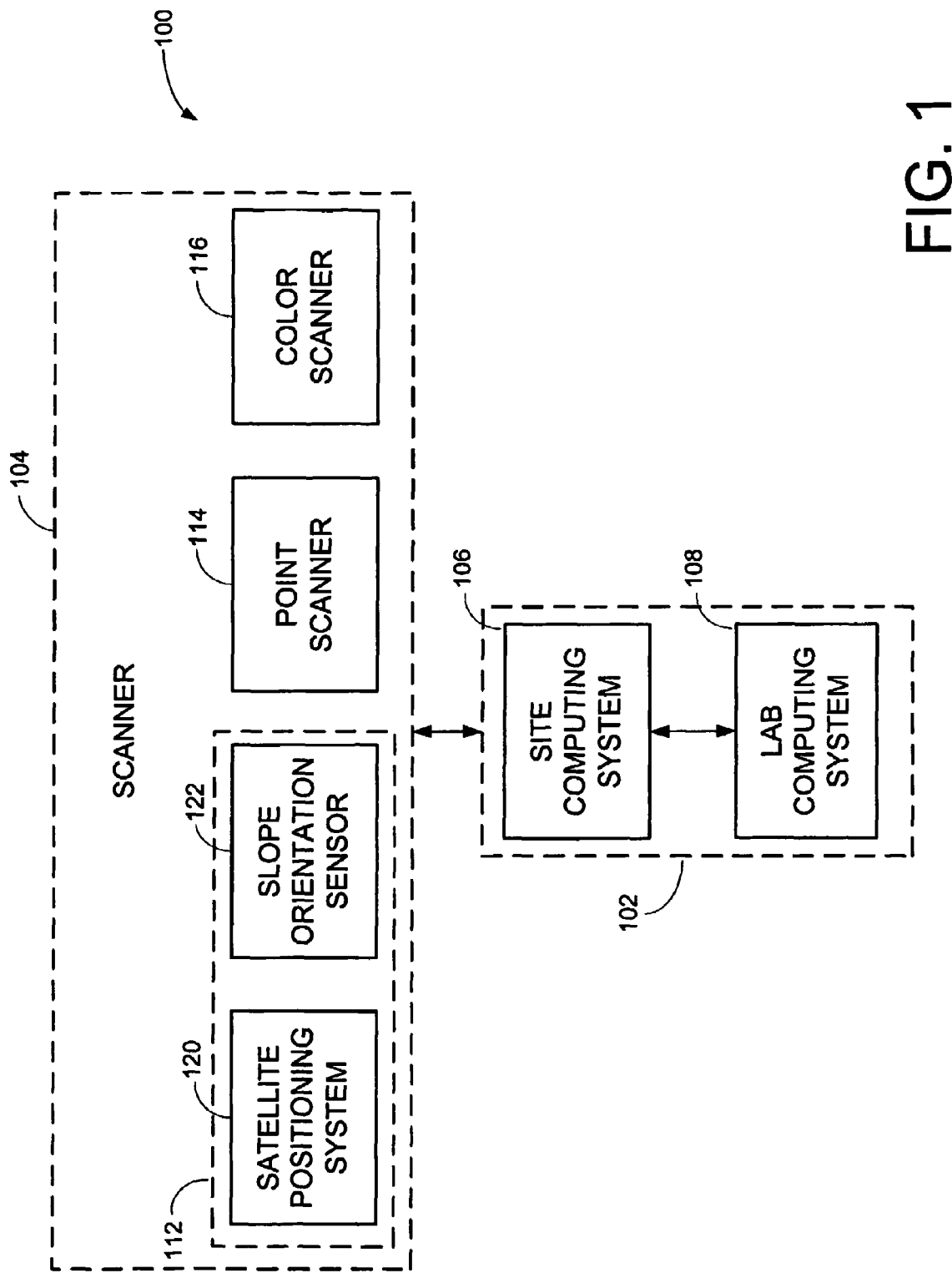
FIG. 1 is a block diagram of an image generation system.

FIG. 1 is a block diagram of an example image generation system 100. The image generation system 100 includes a computing system 102 in communication with a scanner 104. The computing system 102 may be any device(s) capable of executing instructions, performing calculations, storing data, retrieving data and communicating with the scanner 104.

The computing system 102 may include features, functionality and capabilities available in handheld computers, laptop computers, desktop computers, server computers, mainframes, etc. For example, the computing system 102 may include at least one processor, at least one user interface, at least one data storage, at least one communication interface, etc. The illustrated computing system 102 includes a site computing system 106 and a lab computing system 108. Communication between the site computing system 106 and the lab computing system 108 may be with wireless, wireline and/or optical communication paths over one or more networks. Alternatively, data may be transferred between the site computing system 106 and the lab computing system 108 through a memory storage device such as a magnetic and/or electronic memory device. Similar communication techniques may be used between the computing system 102 and the scanner 104.

Although the site and lab computing systems 106 and 108 are illustrated as two separate systems, a single computing system, or three or more computing systems may also be used. In addition, multiple standalone cooperatively operating computing systems may be present in the site computing system 106 and the lab computing system 108.

The scanner 104 may include a positioning system 112, a point scanner 114 and a color scanner 116. The positioning system 112 may be any system that provides position information related to physical positioning of the scanner 104. The scanner position information may include a geographic position, a slope, and an orientation of the scanner 104. The illustrated positioning system 112 includes a satellite positioning system 120 and a slope orientation sensor 122.

The satellite positioning system 120 may be any positioning system operating with triangulation techniques to determine a geographic position of the scanner 104. For example, the positioning system 112 may be a global positioning system (GPS), a differential global positioning system (DGPS) or a global orbiting navigation satellite system (GLONASS). The geographic position may be determined in terms of navigational coordinates (e.g. latitude and longitude). In addition, the height above mean sea level of the scanner 104 may be determined by the satellite positioning system 120.

The slope orientation sensor 122 may be any sensor(s) capable of detecting the level and facing direction of the scanner 104. For example, the slope orientation sensor 122 may include at least one electronic sensor providing electrical signals indicative the of direction the scanner 104 is facing such as, north, south, etc., based on magnetic north. In addition, the slope orientation sensor 122 may include sensors providing electrical signals indicative of the pitch and roll of the scanner 104, for example based on gravity.

The point scanner 114 may be any device capable of measuring an object to develop a point cloud representation of a geometric three-dimensional electronic image of the object. For example, the point scanner 114 may include a laser beam that is selectively directed to different points on an object. Based on the reflected laser beam, a distance between the scanner 104 and each of the points may be determined. The distances may be used to generate geometric point data representative of points on the surface of the object. An example laser scanner is a terrestrial 3D scanner of the LMS-Z series manufactured by Riegl Laser Measurement Systems GmbH of Austria.

A processor included in the point scanner 114 may determine and record the geometric points to form a point cloud. For example, the distance between each of the points on the object and the scanner 104 may be used to determine the point cloud. Example point recording software based on measured distance is RiSCAN software that is available from Riegl Laser Measurement Systems GmbH of Austria.

The color scanner 116 may be any device capable of sensing parameters representative of the color of an object. The color scanner 116 may selectively direct a beam of light at an object. Based on the reflection of the beam off of an object, color parameters may be determined. The detected parameters may be color points that may also be referred to as pixels. The processor in the point scanner 114 may also determine and record the color points.

Image data in the form of geometric points collected with the point scanner 114 may represent the geometric shape of the object. Image data in the form of color points (or pixels), collected with the color scanner 116 may represent the color of the object. As used herein, the term "image data" refers to the combination of the geometric points and the color points.

The point scanner 114 and the color scanner 116 may be two independent scanning devices that operate synchronously to collect image data. The geometric points may be associated with the color points within a scan. For example, the point scanner 114 may emit a light beam that is five centimeters away from a laser beam emitted by the color scanner 116. The color scanner 116 may be a line sensor that scans "lines" of color within a determined area of an object. Each line of color is defined by the width and length of a longitudinally extended beam of light of a determined width that is projected onto the object by the color scanner 116. For example, the color sensor may scan within a determined area that is a vertical or horizontal rectangular area of a determined width and height. The rectangular area may be partitioned into smaller longitudinally extending areas of color (e.g. lines of color) that are sequentially scanned until the entire rectangular area has been scanned completely. Measurement of a line of color results in the detection of color point data that includes color points.

The period of time to detect color points may be longer than the period of time to detect geometric points. Thus, during a scan, the color scanner 116 may operate as a line sensor to detect a line of color points (pixels) in a determined area on the object for a period of time. During the same period of time, the point scanner 114 may detect individual geometric points within the same area. The computing system 102 may then associate the line of color points detected in the determined area with the geometric points detected in the same determined area to form image data.

Alternatively, the color scanner 116 may scan a determined area to collect a determined number of color points. At the same time, the point scanner 114 may detect a determined number of geometric points in the same area. Since scanning the determined area with the color scanner 116 may take longer, fewer color points may be captured and associated with the more numerous geometric points. Gaps between the color points may be filled as discussed later. By synchronously directing the operation of the point scanner 114 and the color scanner 116, the computing system 102 may capture a scan of the object.

During operation, the scanner 104 may be positioned in a first geographic position adjacent to an object to be scanned, such as a building. The term "scan" or "scanned" should be broadly construed to include any data related to the object and/or the scanner 104 that is gathered by the scanner 104 during a determined period of time without geographic repositioning of the scanner 104. The term "scans" refers to different geographic positions of the scanner 104 in which data is gathered.

During a scan, the navigational coordinates, slope, and orientation of the scanner 104 may be determined by the positioning system 112 and provided to the computing system 102. Determination of the navigational coordinates may include taking a number of different reference positions during the scan. The reference positions may be used to calculate an average reference position. The navigational coordinates of the reference position may then be used to describe the geographic position of scanner 104.

In addition, the point scanner 114 may scan the object and generate geometric point data in the form of a point cloud. At the same time, the color scanner 116 may scan the object and generate color point data The geometric point data and the color point data may be synchronously captured by the computing system 102 as image data. Accordingly, at least one geometric point may be associated with at least one color point by the computing system 102.

The computing system 102 may associate the data provided by the satellite positioning system 120 and the slope orientation sensor 122 with the image data provided by the point scanner 114 and the color scanner 116. As a result of the scan, a geometric, three-dimensional, color, electronic image may be developed. The orientation, slope, and the geographic position of the scanner 104 may be associated with the three-dimensional electronic image. As used herein, the term "three-dimensional electronic image" refers to a representation of an object based on image data (geometric points and/or color points) and the position information collected during a single scan. Following completion of the scan in the first geographic position, the scanner 104 may be geographically relocated to a second geographic position and the scanning process repeated.

Figure 2:
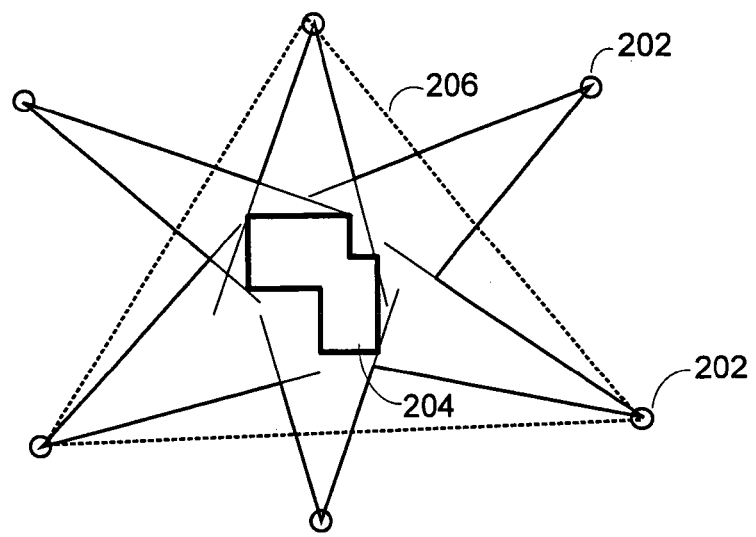
FIG. 2 is an example of scanning positions around an object occupied by a scanner that is included in the image generation system of FIG. 1.

FIG. 2 is an example of a plurality of geographic positions 202 of the scanner 104 (FIG. 1) around an object 204. In the illustrated example, the object 204 is a building. The number of geographic positions 202 (and therefore different scans) may be determined based on the geometric shape of the object being scanned. Enough scans are performed to provide overlap of the geometric point data and the color point data collected by the scanner 104 during each scan.

In FIG. 2, three geographic positions representing points on a triangle 206 are identified as locations to perform scans. The triangle 206 is sized such that a boundary of the object 204 is completely enclosed within the triangle 206. Based on the shape and/or different surfaces of the object 204, three scans may be performed. Additional scans may however be needed to accurately capture the entire surface of the object.

If the point scanner 114 is a laser scanner, surface areas of the object 204 that are not in line-of-sight of the scanner 104 may not be represented in just three scans. Accordingly, the scanner 104 may also be geographically positioned to in line-of-sight of the various features of the object and additional scans performed.

The number of scans (e.g. the number of three-dimensional electronic images) needed to generate a three-dimensional electronic model representative of the object may be minimized based on the symmetry of the object. Objects that include symmetrical portions may be reproduced electronically instead of scanning of its surfaces. In other words, where a scanned portion of the object is symmetrical with an un-scanned portion of the object, scanning of the un-scanned portion may be avoided. Instead, the scanned portion may be mirrored to represent the un-scanned portion.

Figure 3:
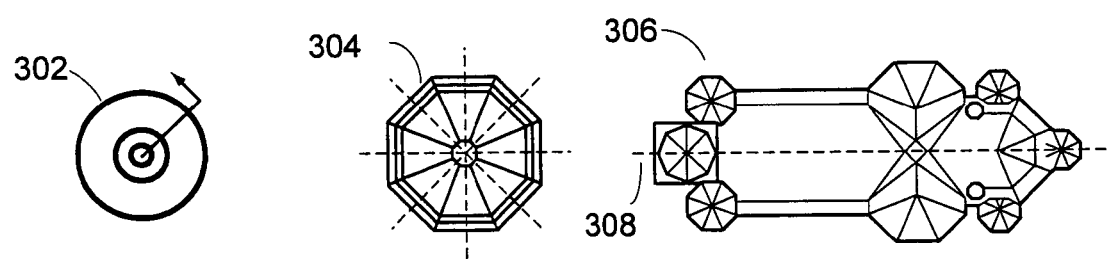
FIG. 3 is an example of various objects that may be scanned with the image generation system of FIG. 1.

FIG. 3 illustrates various example objects that may be scanned with the scanner 104. A first object 302 is rotationally symmetric. Example objects with rotationally symmetrical areas may include television towers, water towers, etc. Where an object is rotationally symmetric, three-dimensional modeling may be performed based on two or more scans. A second object 304 has four symmetrical areas such that three-dimensional electronic modeling may be performed with four or more scans. A third object 306 is symmetrical along an axis 308. Thus, scans may be performed along only one side or more of the axis 308.

When all the scans of the object have been captured, the computing system 102 of FIG. 1 may combine the individual scans to form a three-dimensional electronic model representing the object. As used herein, the term "three-dimensional electronic model" refers to the combination of two or more three-dimensional electronic images. The combination of the individual scans (the three-dimensional electronic images) may be based on the geographic position of the scanner 104 during each of the scans. Accordingly, the geographic location of the scanner 104, as well as the pitch, the roll, the orientation and the height may be used to determine the proper amount of translation and rotation of each of the three-dimensional electronic images with respect to each other.

Following generation of the three-dimensional geometric model in electronic form, the surfaces of the model may be texturized using the computing system 102. Texturization involves identifying one or more source textures based on the visual appearance of the object to be scanned. The source textures may be used to create a transformation procedure to transform one or more source textures into complex textures. The complex textures may represent one or more different surfaces of the object. The transformation procedures may be associated with one or more surfaces within the three-dimensional electronic model. Complex textures may therefore be created from the source textures at the time the model is displayed.

The complete colored, texturized three-dimensional electronic models may be utilized in any application where computer generated images representative of the object are desired. For example, where the object is a building or landmark, the corresponding model may be exported to navigation software or other applications for displaying the object within a navigational map. In other examples, cities may use the objects for zoning and tourism. In addition, wireless service providers may identify signal paths, interferences, object heights, etc., from the three-dimensional electronic models.

The image generation system 100 provides an efficient and cost effective way to create three-dimensional electronic models of objects. Objects modeled with the image generation system 100 may be accurately scaled, colored and texturized without manually creating each three-dimensional electronic image. In addition, individual three-dimensional electronic images may be combined using the image generation system 100 to form a three-dimensional electronic model. Since the models are in electronic form, the data may be exported/imported to any other application where accurate and realistic three-dimensional electronic models are desired.

Figure 4:
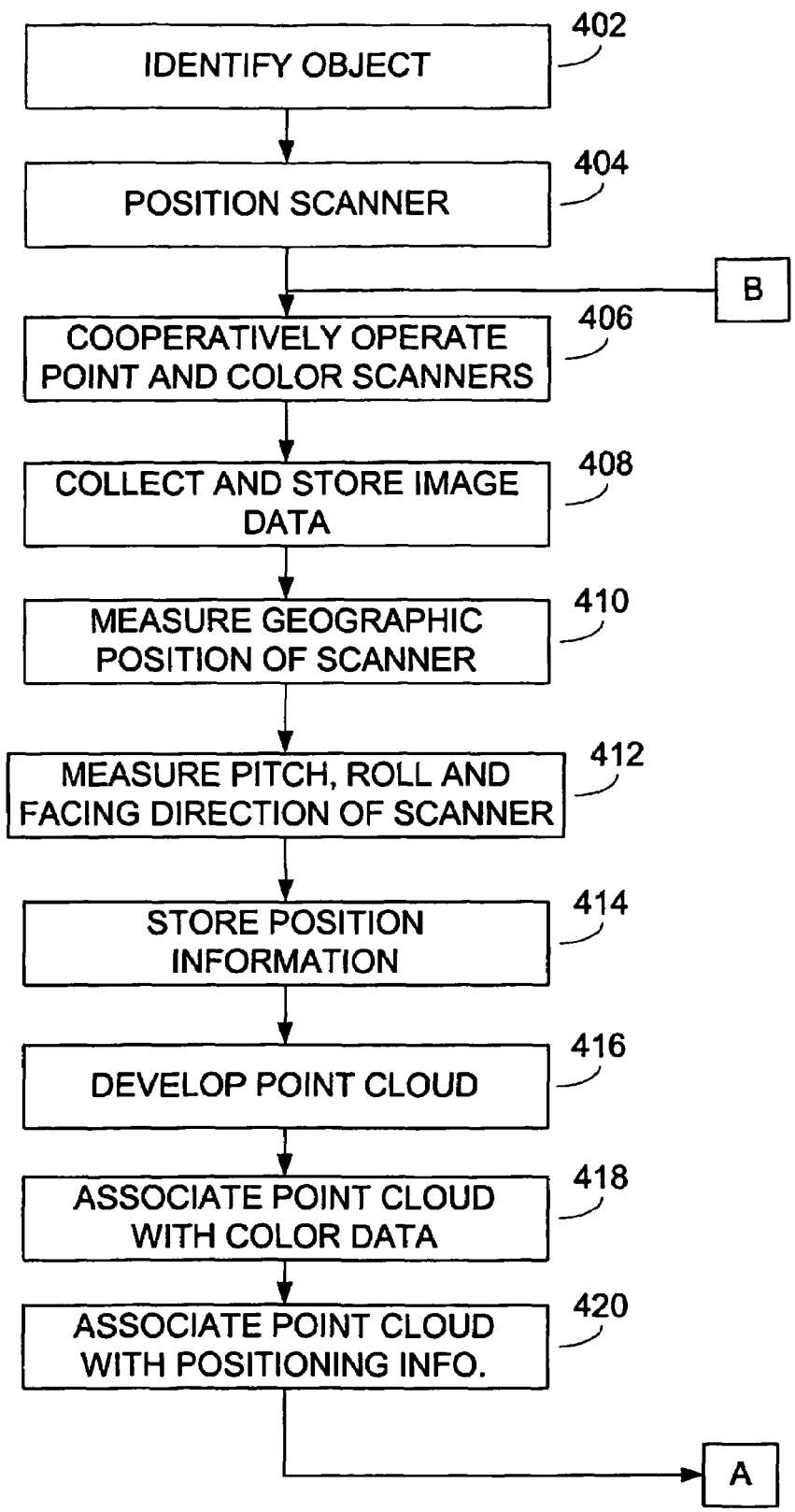
FIG. 4 is an example flow diagram illustrating operation of the image generation system of FIG. 1.
Figure 5:
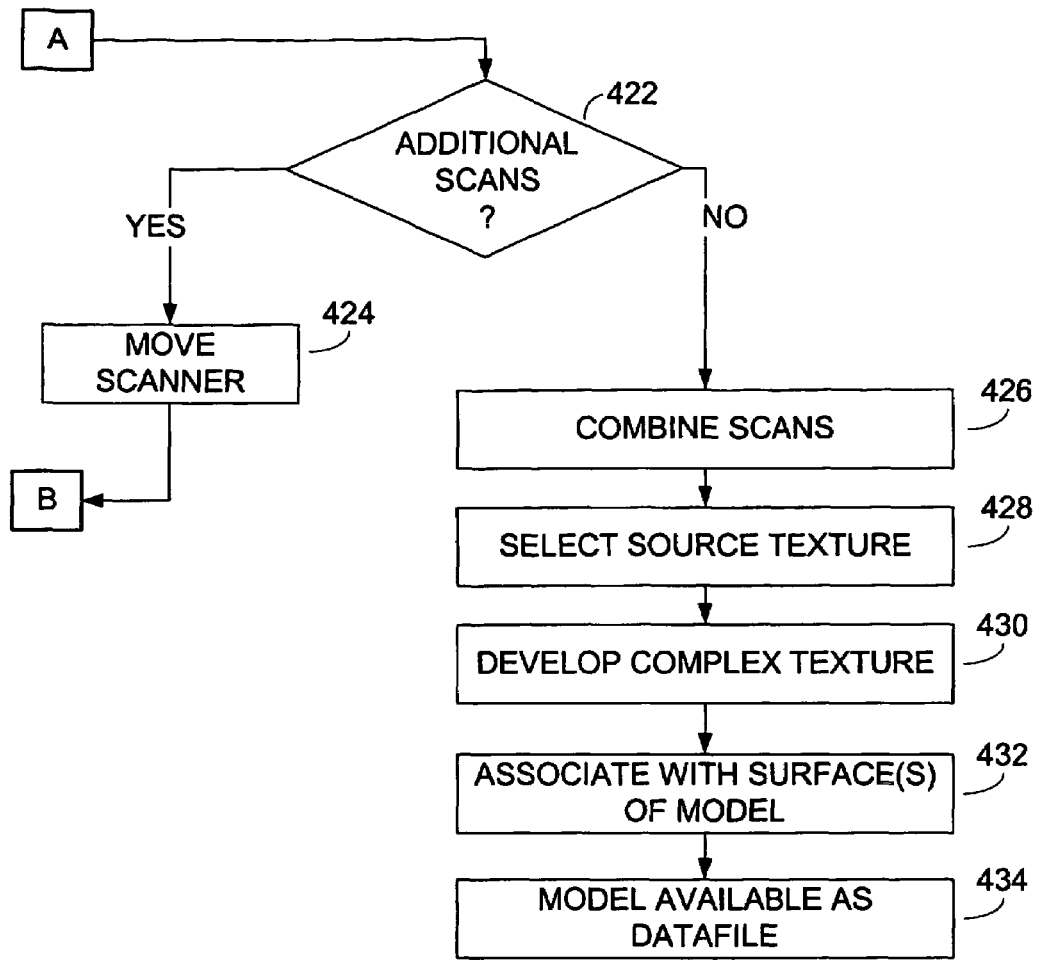
FIG. 5 is a second part of the example flow diagram of FIG. 4.

FIG. 4 is a process flow diagram illustrating operation of the image generation system 100 illustrated in FIG. 1. At block 402, the object to be scanned is identified. The scanner 104 is positioned in a first position adjacent to the object at block 404. At block 406, the point scanner 114 and the color scanner 116 are operated synchronously to scan the object. The geometric point data provided by the point scanner 114 and the color point data provided by the color scanner 116 are collected and stored as image data at block 408.

The satellite positioning system 120 performs measurements and records the geographic position of the scanner 104 at block 410. At block 412, the slope orientation sensor 122 performs measurements and records the pitch, the roll, and the orientation of the scanner 104. The position information is stored at block 414. At block 416, a point cloud is developed from the scan that is a three-dimensional electronic image representing the scanned surface(s) of the object. The geometric point data is associated with color point data to colorize the three-dimensional electronic image at block 418. The point cloud is associated with the positioning information at block 420.

At block 422, it is determined whether additional scans should be performed. If additional scans should be performed, the scanner may be moved to another geographic position at block 424 and the operation returns to block 406 to capture data and develop another three-dimensional electronic image. If no additional scans are needed, the image data from each of the three-dimensional electronic images is combined using the position information to develop a three-dimensional electronic model of the object at block 426. At block 428, one or more source textures are selected based on the actual texture present on the object. Using the source texture(s), complex texture(s) and a corresponding transformation procedure(s) are developed at block 430. At block 432, the source texture(s) and the transformation procedure(s) (e.g. the complex texture(s)) are associated with one or more surfaces of the three-dimensional electronic model. The three-dimensional electronic model is available as a datafile at block 434.

Figure 6:
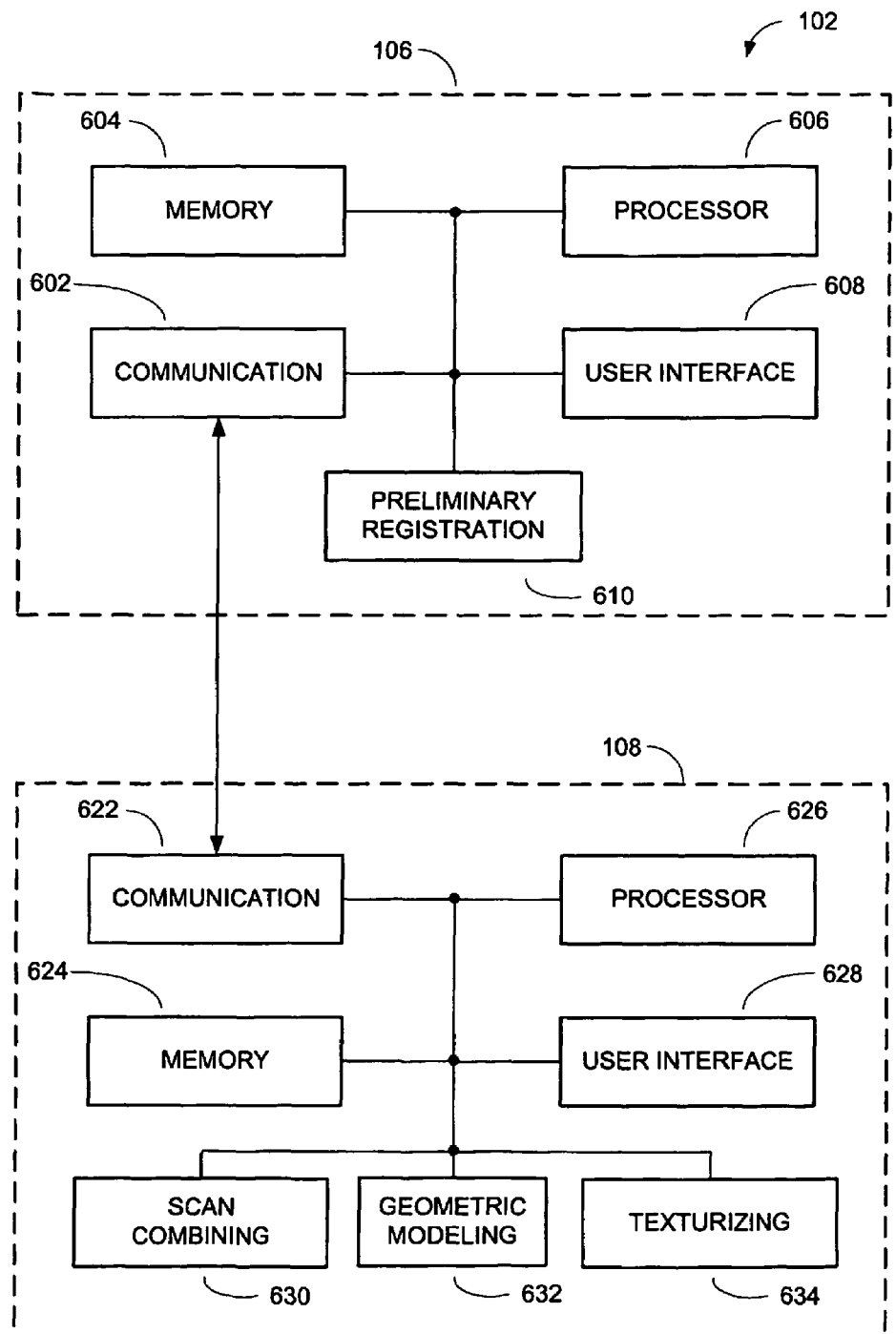
FIG. 6 is a block diagram of a computing system included in the image generation system of FIG. 1.

FIG. 6 is a more detailed block diagram of an example computing system 102 that includes the site computing system 106 and the lab computing system 108. The example site computing system 106 includes a communication module 602, a memory module 604, a processor module 606 and a user interface module 608. In addition, the site computing system 106 may include a preliminary registration module 610. In other examples, fewer or greater numbers of modules may be used to illustrate the functionality of the site computing system 106.

The communication module 602 may be any device capable of provide communication with the scanner 104 (FIG. 1) and the lab computing system 108. In addition, the communication module 602 may include data acquisition functionality that provides input/output (I/O) capability related to the scanner 104 (FIG. 1). The I/O capability may include input and output channels, communication ports, signal conversion, filtering, buffering, wireless communication, wireline communication, optical communication and/or any other I/O related capability. Example signal inputs and outputs include analog signals, digital signals and communication protocols, such as RS422, TCP/IP, Bluetooth, 802.11, SMS, proprietary protocols, and any other communication protocols.

The memory module 604 may be a memory device or a medium where data may be stored and retrieved. For example, the memory module 604 may include electronic memory such as a flash memory, a random access memory (RAM) and/or magnetic memory such as a hard drive(s), an optical disk(s), etc. Data stored in, and accessed from, the memory module 604 may include scans and other scanner related data. In addition, operating instructions, such as computer code/software related to the functionality and operation of the modules within the image generation system 100 (FIG. 1) may be stored and accessed. Accordingly, instructions and data stored in the memory module 604 may provide the functionality and operative cooperation of the other modules in the site computing system 106. Although illustrated as a single module, the memory module 604 may include multiple memory modules. The multiple memory modules may support the other modules of the image generation system 100.

The processor 606 may be any control unit or computer based device(s) capable of interfacing with the communication module 602, the memory module 604 the user interface module 608 and the preliminary registration module 610. Interfacing with the communication module 602 may include receiving incoming signals and/or data and directing the generation of outgoing signals and/or data. Interfacing with the memory module 604 may include executing instructions stored in the memory module 604 to generate, store, manipulate and/or extract data within the memory module 604 related to the operation of the image generation system 100 (FIG. 1). The processor 606 may also coordinate operation of the site computing system 106 and exchanges of data between the communication module 602, the memory module 604, the user interface module 608 and the preliminary registration module 610.

The user interface module 608 may include functionality supporting buttons, display screens, touch screens, indicators, transducers and/or any other mechanisms providing an interface for a user to the image generation system 100 (FIG. 1). In addition, the user interface module 608 may provide visual renderings of the three-dimensional electronic images, geometric points, color points, three-dimensional electronic models, position information, and any other data collected by the image generation system. Operation of the user interface module 608 may be based on instructions executed by the processor 606 and inputs provided by the user.

The preliminary registration module 610 may cooperatively operate with the user interface module 608 to view and manipulate the scans based on instructions executed by the processor 606. Manipulation of the scans may involve a user manually moving and rotating the three dimensional electronic images associated with each of the different scans. The point clouds may be moved and rotated to fit together and form a preliminary three-dimensional electronic model from the three-dimensional electronic images.

The process of joining the individual scans to form a three-dimensional electronic model is called "registration." In this case, the registration may be performed manually on site, and therefore may be referred to as "preliminary registration" or "provisional registration." Since the manipulation of the scans by the user occurs at the site where the object is scanned, the user may visually compare the preliminary three-dimensional electronic model to the actual object when combining the different three-dimensional electronic images.

In addition, the preliminary registration module 610 may perform automated manipulation of the scans to form the preliminary three-dimensional electronic model. Automated manipulation may involve use of the point clouds and the position information from each of the scans to form a preliminary three-dimensional electronic model. Following automated manipulation, the user may further manipulate the various point clouds manually as previously discussed. When manipulation is complete, the preliminary three-dimensional electronic model may be provided to the lab computing system 108.

Alternatively, the scans may be provided to the lab computing system 108 without manipulation. Where the scans are not manipulated with the site computing system 106, the preliminary registration module 610 may be omitted. Accordingly, the as-collected scans may be transmitted or otherwise provided to the lab computing system 108 for further processing.

The example lab computing system 108 illustrated in FIG. 6 includes a communication module 622, a memory module 624, a processor module 626 and a user interface module 628. In addition, the lab computing system 108 may include a scan combining module 630, a geometric modeling module 632 and a texturizing module 634. In other examples, fewer or greater numbers of modules may be used to illustrate the functionality of the lab computing system 108.

The communication module 622, the memory module 624, the processor module 626 and the user interface module 628 may be similar to the previously discussed communication module 602, the memory module 604, the processor module 606 and the user interface module 608 included in the site computing system 106. The processor module 626 may control the overall operation of the lab computing system 108 by executing instructions stored in other modules including the memory module 624. In addition, the processor module 626 may allow cooperative operation of the communication module 622, the memory module 624, the user interface module 628, the scan combining module 630, the geometric modeling module 632 and the texturizing module 634.

The lab computing system 108 may perform a registration process referred to as a "precise registration." The precise registration occurs when the geometric points in the point cloud of each three-dimensional electronic image are joined by the scan combining module 630. In addition, the joined point clouds may be precisely fit together to form a final three-dimensional electronic model using the geometric modeling module 632.

When preliminary registration has been performed, any of three techniques may be used by the lab computing system 108 to perform precise registration. In a first technique, the individual point clouds representing each electronic three-dimensional image may be combined to form a model point cloud that includes all the image data of the individual point clouds. Manipulation to align the point clouds may involve identifying matching geometric points within the different scans. Once the various point clouds are aligned and combined to form the model point cloud, surfaces within the model point cloud may then be determined.

Instructions executed by the processor 626 may join the geometric points within the model point cloud to represent a surface. Surfaces may be determined by the scan combining module 630 from the geometric points. Determination of surfaces may involve analyzing geometric points with respect to surrounding geometric points within the point cloud.

A surface that includes at least two geometric points may first be identified. A determined distance between the identified surface and another geometric point may be used to determine if the geometric point is part of the identified surface. For example, a normal vector may be identified between a surface and a geometric point. If the geometric point is within a determined distance, such as five centimeters, the geometric point may be assigned to the surface and the surface re-calculated. All geometric points within a determined distance of each other may be considered for inclusion as part of a surface. If a geometric point is within a determined distance of multiple surfaces, the geometric point may be at a corner or edge of the object and may therefore be assigned to each of multiple surfaces. Once surfaces have been determined within the model point cloud, the joined point clouds may be precisely fit together to form a final three-dimensional electronic model using the geometric modeling module 632. In addition, textures may be associated with the surfaces.

In a second technique, surfaces are individually determined in each point cloud. The surfaces may be determined based on the geometric points in the point cloud as previously discussed. Once the surfaces are identified, textures may be associated with the surfaces. The point clouds may then be combined. Combination of the point clouds in this technique may be based on the surfaces and/or the textures instead of the individual geometric points in each point cloud. Once the point clouds are combined, the joined point clouds may be precisely fit together to form a final three-dimensional electronic model using the geometric modeling module 632.

In a third technique, surfaces are individually determined in each point cloud from the geometric points. Once the surfaces are determined, an outline of each surface is determined. The outlines of each surface form a framework depicting each of the three-dimensional electronic images. The frameworks of each scan may then be combined to form a framework model. Combination of the frameworks may be based on alignment of the outlines of the surfaces from the various point clouds. Once the point clouds are joined, the joined point clouds may be precisely fit together to form a final three-dimensional electronic model using the geometric modeling module 632. In addition, textures may be associated with the surfaces.

When preliminary registration has not been performed, precise registration may involve joining the color points and the geometric points in each point cloud to form lines. The color points and geometric points may be joined by instructions in the scan combining module 630. The point clouds may be converted from a three-dimensional electronic image represented with geometric points and color points to the same three-dimensional electronic image represented with one or more lines. A selected number of geometric points are therefore converted into a single one-piece line.

Each of the lines may be in the form of outline data. The outline data may provide significantly more efficiency in data manipulation capability since a single line may replace a relatively large number of geometric and color points in a point cloud. For example, when the point cloud is representative of an object that is a building, the scan combining module 630 may execute instructions to generate lines for sections of the building from a three-dimensional electronic image. Outline data files may therefore be generated for each scan.

Figure 7:
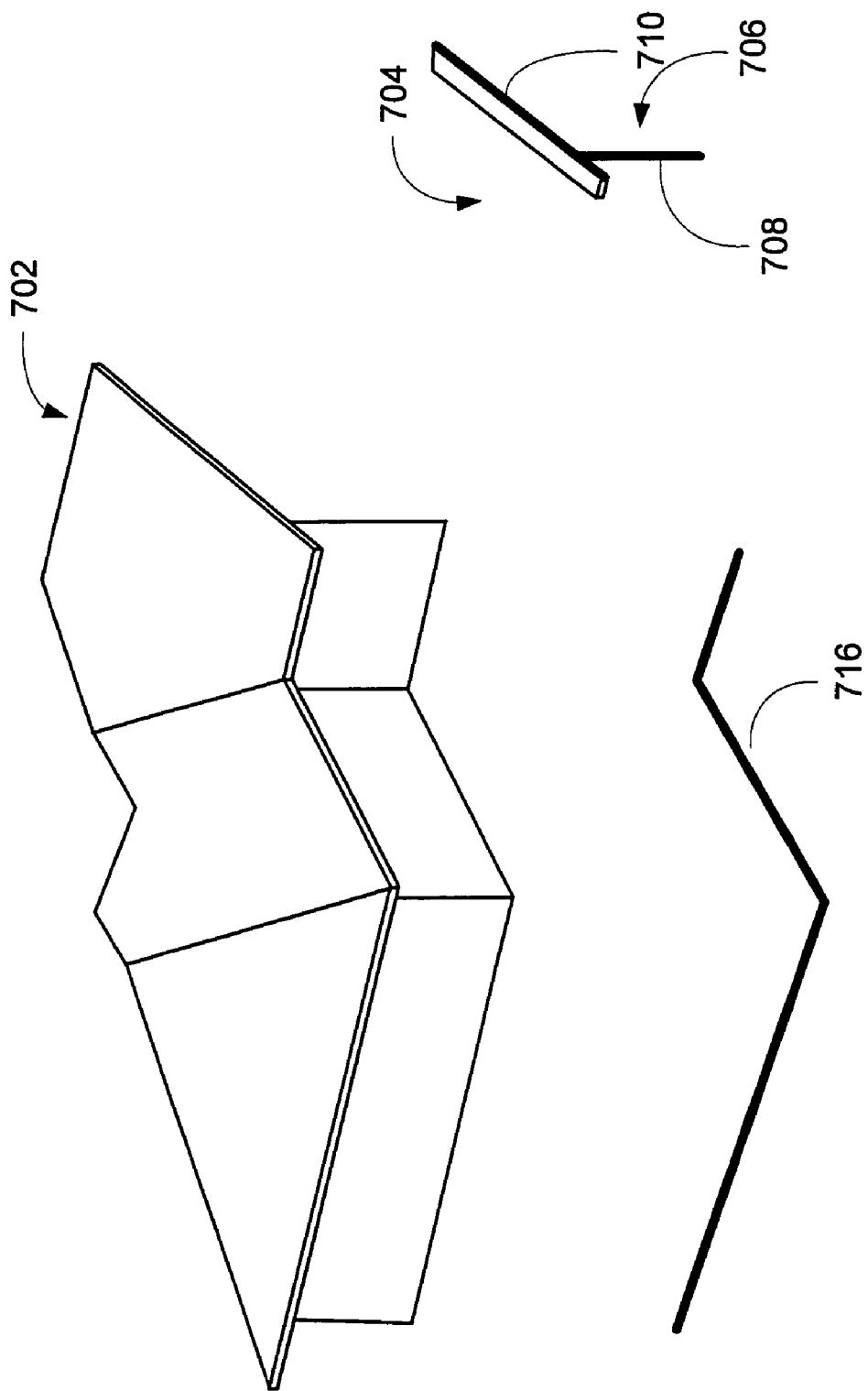
FIG. 7 is an example electronic three-dimensional image developed with the image generation system of FIG. 1.

FIG. 7 is an example three-dimensional electronic image 702 developed from scanning an object that is a house. To generate outline data files, the three-dimensional electronic image 702 developed from the point cloud of a scan may be partitioned into sub-images 704. For example, the three-dimensional electronic image 702 may be partitioned into sub-images 704 that are each about one meter thick.

Partitioning into sub-images 704 involves "slicing" the point cloud into segments. The "slices" may be vertical, horizontal, sloped, etc. Within each of the sub-images 704, a line 706 may be developed that is a single one-piece line. The line 706 is representative of the sub-image (e.g. the segment of the point cloud). In the example of FIG. 7, a first part 708 of the line 706 may represent the portion of the point cloud forming a first wall of the house. A second part 710 of the line 706 may represent a first half of the roof. In addition, the object such as the building may be partitioned horizontally into a sub-image(s) that is a partial floor plan 712. The partial floor plan 712 may similarly be developed into a line. An example application capable of creating sub-images is Cyclone software available from Cyra Technologies, Inc. of San Ramon, Calif.

Each sub-image represented by a line may be stored in an outline data file and provided to the geometric modeling module 632 (FIG. 6). For example, each of the outline data files may be .dxf or .dwg files. Since each portion of the point cloud depicting each sub-image has been reduced in complexity and size to a line, required data storage capacity, data transfer capacity and processing power related to the three-dimensional electronic images may be reduced. In addition, manipulation of the lines from each of the scans simplifies the creation of a three-dimensional electronic model.

The geometric modeling module 632 in FIG. 6 may include instructions to complete the precise registration of the scans by precisely combining the three-dimensional electronic images to develop a three-dimensional electronic model. In addition, the geometric modeling module 632 may add geometric-related data to the scan data to develop the three-dimensional electronic model. An example geometric modeling module 632 may include ArchiCAD® software available from Graphisoft® U.S., Inc. of Newton, Mass.

The surfaces identified by the scan combining module 630 within each three-dimensional electronic images may be assembled by the geometric modeling module 632 into the three-dimensional electronic model. Alternatively, where each of the three-dimensional electronic images have been reduced to geometric sub-images in the form of lines, the lines may be similarly assembled by the geometric modeling module 632 to form the three-dimensional electronic model. Where a preliminary three-dimensional electronic model was provided from the site computing system 106, the three-dimensional electronic images may be further manipulated during precise registration with the geometric modeling module 632 to form a final three-dimensional electronic model. The portion of the precise registration performed by the geometric modeling module 632 may involve more detailed processing of the various point clouds to more accurately fit the various three-dimensional electronic images together into a geometric image.

The detailed processing to fit the three-dimensional electronic images together more precisely to form the three-dimensional electronic model may be automated, manual or some combination of manual and automatic. Manipulation and combination of the three-dimensional electronic images during the detailed processing may involve instructions to change the position and/or rotation of the three-dimensional electronic images to precisely fit together. The three-dimensional electronic images may be manipulated with respect to each other based on the position information determined by the positioning system 112. Where the three-dimensional electronic images have been partitioned into lines, the lines representative of the sub-images may be similarly combined and manipulated with the geometric modeling module 632.

Manipulation and combination of the three-dimensional electronic images may involve identifying geometric points within the point cloud of a first three-dimensional electronic image that are close together (such as those points forming a surface) and measuring the distances between the geometric points in the first three-dimensional electronic image and geometric points in a second three-dimensional electronic image. Using iterative processing, such as Gaussian based calculations, geometric points in the first three-dimensional electronic image that are similar to geometric points in the second three-dimensional electronic image may be identified.

Based on an error between the similar geometric points in the different three-dimensional electronic images, iterations of manipulation and recalculation may be performed until the error is minimized. The error may be determined based on a squared error minimization technique involving the summation of all squared distances between neighboring geometric points of different three-dimensional electronic images. Where the point clouds have been partitioned into sub-images, the distances between lines may similarly be used to manipulate and combine the lines.

The color may also be manipulated during precise registration by the geometric modeling module 632 to generate the three-dimensional electronic model. The color points may be collected synchronously with the geometric points. As such, color points may be associated with the geometric points in the three-dimensional electronic images. For example, one color point may be associated with nine geometric points; therefore the color point may be interpolated between the geometric points.

Alternatively, where the color points are not collected synchronously with the geometric points, stretching and skewing may be utilized to associate color with the geometric points. For example, where a photograph is used for the color of an electronically represented object, the color(s) in the photograph may be stretched and skewed to fit the geometric surfaces represented with the geometric points or the lines.

During operation, the translation and rotation information of how the individual three-dimensional electronic images were combined may be utilized to map color pixels to the geometric points. Differences in color from the same area in different scans may be resolved by the geometric modeling module 632 using picture processing techniques such as, image comparison of similar images, pixel comparison of similar pixels or any other picture processing techniques to resolve such differences among different scans. In addition, the navigational coordinates may be utilized to determine differences in the angle of the suns rays (e.g., shadows, etc.) during different individual scans. Further, gaps in the color(s) of the surface(s) may be filled between color points. The filling of gaps may be completed by, for example, interpolating the surrounding colors with a rasterization process.

The rasterization process may be performed by the geometric modeling module 632 by dividing a surface of a three dimensional electronic image into a plurality of triangles. The triangles may be non-overlapping and formed by selectively connecting the geometric points within the surface to form point triangles. Lines between the geometric points may depict the three sides of each point triangle. In addition, border triangles may be formed.

The border triangles may be formed between geometric points around the periphery of the surface and a border. The border may be formed to surround the surface around the outer edge of the surface. The border triangles may be formed with a geometric point such that two of the three sides each of the border triangles extending from the geometric point to the border. The third side of each of the border triangles may be formed by the border.

The color points associated with the surface may be used to create shading between the existing color points within each of the triangles. The shading may be created by adding new color points in each of the triangles between the existing color points. The number of new color points that are added may be based on the amount of detail (resolution) that is desired on the surface.

Determination of the new color points may be based on color blending by moving within the color spectrum between the existing color points. Color blending may be performed by interpolation between existing color points, the difference in distance of a new color point from various existing color points, and/or any other color evolving technique to move within the color spectrum between the existing color points. As a result of the rasterization, shading of the area of the surface defined by each of the triangles may stay the same, may have slight adjustment to the color and/or may have significantly different the colors. Each triangle may therefore include any number of colors or color variations depending on the existing color points in each triangle and/or existing color points in adjacent triangles.

The geometric modeling module 632 may also organize the three-dimensional electronic model into a determined structure. The structure of the electronic representation of an object modeled with the geometric modeling module 632 may be divided into layers. The layers of the three-dimensional electronic model may include a first layer that is a simple layer, a second layer that is a construction layer, a third layer that is a position layer, a fourth layer that is a library layer and a fifth layer that is a picture layer. The simple layer may include the three-dimensional geometric structure representative of the scanned object. The construction layer may include construction elements, such as lines, curves, splines, points, text information, comments and any other creation related information that has been used during the construction process of the three-dimensional electronic model.

The position layer includes information related to the positions of the scanner 104 when the scan data was collected. Position layer information may include a site plan sketch and a marked position. The marked position may provide geographic coordinates as well as the slope and the height obtained by the position system 112 (FIG. 1) during scanning. The information may be displayed within the site plan sketch.

The site plan sketch may be a displayable illustration that is to the same scale, position and orientation as the three-dimensional electronic model. Variance from a determined direction, such as north, may be identified in the site plan sketch. The site plan sketch may also display the three-dimensional electronic model. The orientation of the three-dimensional electronic model in the site plan sketch may be such that the north orientation of the object is adjacent to the upper edge of the display.

The library layer may include library elements in the form of instructions and data. The library elements may be constructed for use in the modeling process to represent various aspects of the object being modeled. The library layer may also include the transformation procedures for transforming source texture(s) to form complex texture(s). The picture layer may be an optional layer. Where photographs are taken of an object, the picture layer may include sketches of the geographic positions of the photographer when the pictures were taken, as well as unique identification, such as the name, of the photographer.

The model size of the geometrical structure of each object being modeled with the three-dimensional electronic model may be scaled to a uniform size. An object may be geometrically represented at a determined scale by the model with a plurality of polygons. The number of polygons chosen to represent the object may be chosen based on desired resolution, hardware limitations or any other consideration effecting performance or display. For example, where it is desirable to render ten different electronic models on a display in one second, and the graphics processor is limited to rendering 10,000 polygons in a second, up to 1000 polygons may represent the geometric shape of an object in a three-dimensional electronic model. Each of the polygons may include n vertexes, where n>2.

The structure of the three-dimensional electronic models may consist exclusively of one or more planar flat planes. Each of the planes, such as walls, ceilings, roofs, etc. may have a depth (thickness) of zero. Where color points were not captured synchronously with geometric points, characteristic surfaces of the planes within the three-dimensional electronic model may be presented in a determined color. The color may generally resemble the displayed material, such as brick=red, vegetation=green, etc. In addition, visual representation of features on the surfaces of the various planes such as doors, windows, colored facade patterns, etc. are not modeled. The representation of the features on the surfaces of the object may be realized by adding texture to the three-dimensional electronic model.

The three-dimensional electronic images forming the three-dimensional electronic model should not be visually represented as being overlapped. As such, edges of planes as well as outer edges contacting each other within the model should be closed. In other words, the visual display of the three-dimensional electronic model should not include any holes, slashes or other breaks that are not present in the visually perceived actual object. Further, volume compounds of the three-dimensional electronic model are closed. For example, where the object is a building, the ground floor of the representative three-dimensional electronic model may have a closed outline.

The geometric modeling module 632 may also include height compensation. The height compensation may be applied within the three-dimensional electronic model to simulate slopes and other gradients. The graphical image representative of an object on the display may be projected on a plane. The plane may be representative of a resting surface such as the earth's surface, parking lots, streets etc. Where the resting surface is sloped, such as to form an incline plane, height compensation may be applied.

Figure 8:
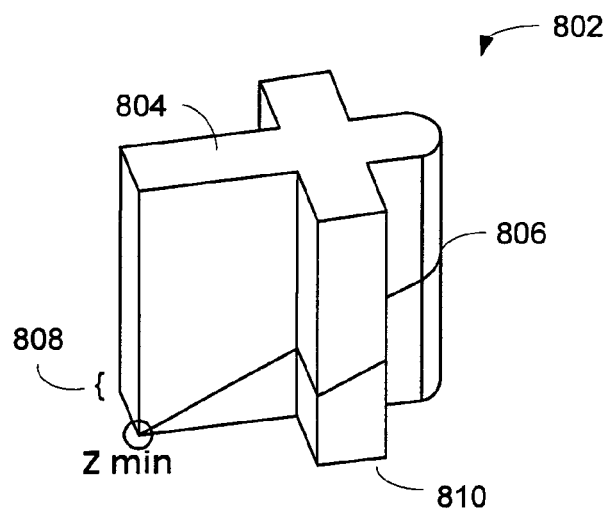
FIG. 8 is another example electronic three-dimensional image developed with the image generation system of FIG. 1.

FIG. 8 illustrates an example three-dimensional electronic image 802 that is representative of an object 804 positioned on an inclined plane 806 such as a hillside. The illustrated object 804 is a building. Objects positioned on significantly inclined planes that are scanned may result in a three-dimensional electronic model that does not account for the inclined plane. In other words, the object may appear to be represented with a portion missing.

The geometric modeling module 632 may not "even-up" the outer edges of the model by making changes in elevation without a noticeable difference in the geometric shape of the represented object 804. In the illustrated example, the outline of the object 804 includes a ground floor 808. The ground floor 808 may provide a base for the construction of an architrave block 810 to compensate for variations in height. The architrave block 810 may be generated from the ground floor 806. Adjustment of the architrave block 810 to fit the object 804 may be based on an adjustment point ($Z_{min}$).

Figure 9:
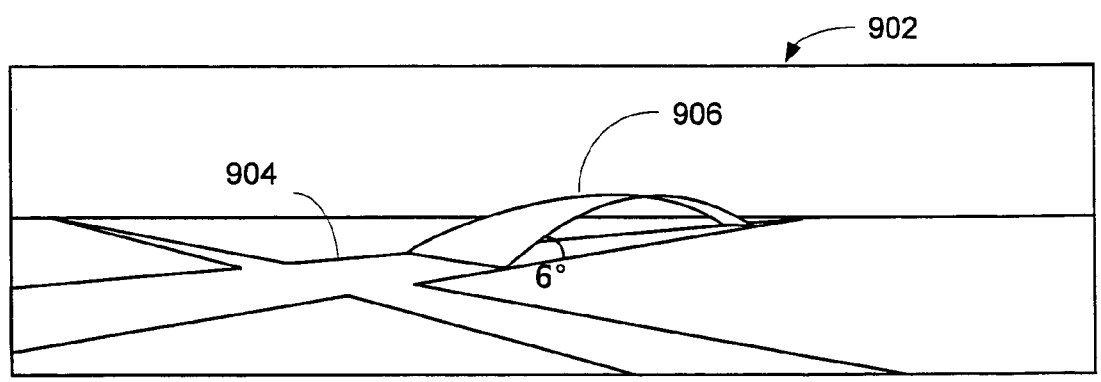
FIG. 9 is still another example electronic three-dimensional image developed with the image generation system of FIG. 1.

FIG. 9 illustrates another example of a three-dimensional electronic image 902. The three-dimensional electronic image 902 includes representations of a street surface 904 and a bridge 906. The transition between the street surface 904 and the bridge 906 may be represented as floating. The term "floating" refers to the angular relationship between the street surface 904 and the bridge 906. In the illustrated example, the angles flanking each other may be different up to about six degrees.

The texturizing module 634 illustrated in FIG. 6 is a texturizing system that includes instructions to generate one or more textures for one or more surfaces of a three-dimensional electronic model. Textures may also be generated with the texturizing system for the surface(s) of three-dimensional electronic images or any other form of electronic representation of an object. Accordingly, the textures created with the texturizing system are not limited to representation of the surfaces of three-dimensional electronic images and/or models generated as previously discussed. Further, the texturizing system is not limited to operation in the previously described example of an image generation system. Instead, the texturizing system may be a standalone system, or may cooperatively operate with any system capable of providing electronic images.

The texturizing module 634 may include instructions to generate new textures. The new textures may be generated by modification and/or combination of existing textures. The texturizing module 634 may also include instructions to support a texture library accessible to multiple users. The textures in the texture library may be used to texturize three-dimensional electronic models of objects such as buildings.

In the illustrated example, the texture module 634 may be that portion of the image generation system 100 that is used for rapid texture generation. Its functionality may generate new or adjusted textures (complex textures) based upon existing textures (source textures). For example, a unique part(s) of a building may be taken from a photo or picture and included as source texture(s). The texture of the various parts of the building may be represented by the source texture, a different source texture and/or transformation of one or more source textures to form complex textures.

Accordingly, a significant expense in computer memory and texture capture and/or generation may be avoided by reduction in the generation of possibly hundreds of different textures from photos or pictures. The savings may be realized without reverting to simple generic textures which may be nondescript and/or unattractive. The nearly boundless possibilities of combinations of source texture may produce desirable complex textures that are adapted to the three-dimensional electronic model without consuming excessive memory. In other words, the procedure to generate a complex texture may be stored instead of an image of the complex texture. Alternatively, the complex textures themselves may be stored.

Figure 10:
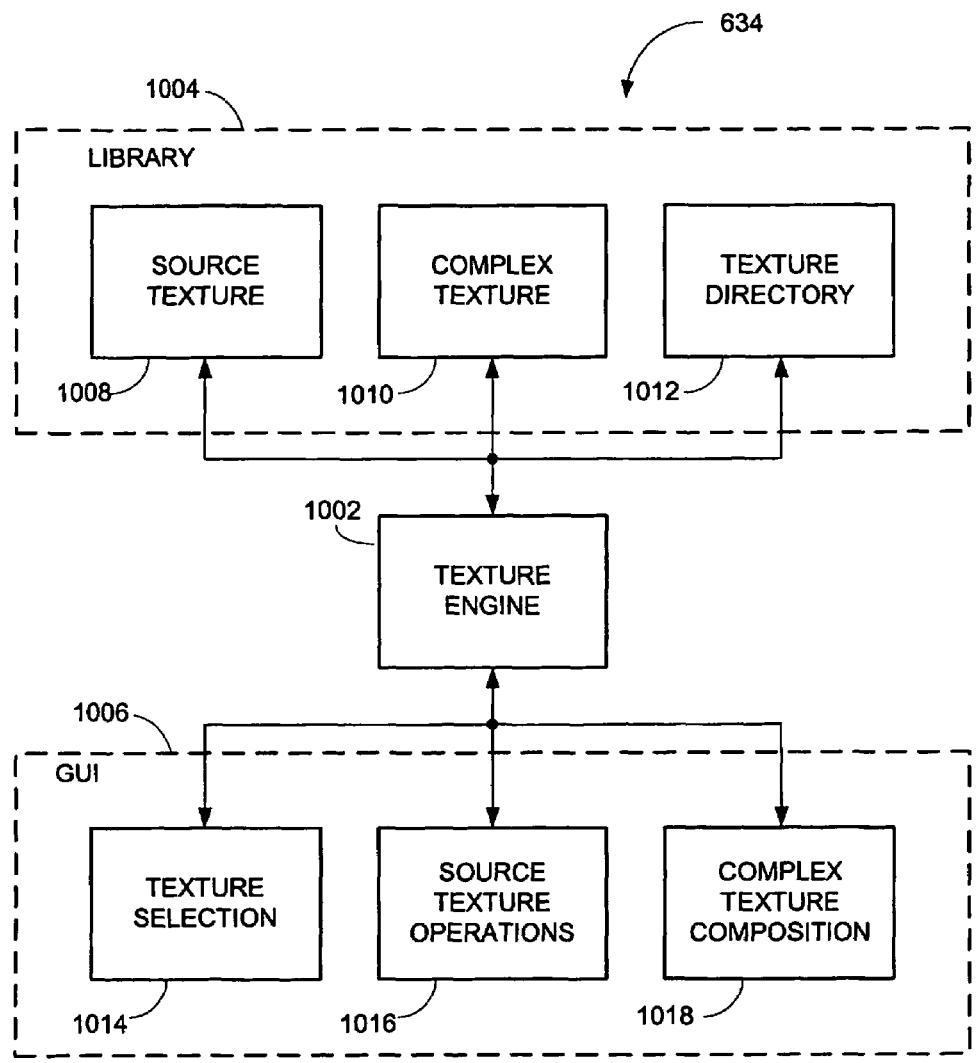
FIG. 10 is a block diagram of a texturizing module included in the computing system of FIG. 6.

FIG. 10 is a more detailed block diagram example of the instructions within the texturizing module 634 illustrated in FIG. 6. The texturizing module 634 includes a texture engine 1002, a library component 1004 and a graphical user interface (GUI) component 1006. In other examples, fewer or greater numbers of engines and components may be illustrated to represent the functionality of the texturizing module 634. In addition, in other examples, the texturizing module 634 may be operated external to, and independent of, the lab computing system 108.

Instructions in the texturizing module 634 may be developed in C++, Visual Basic, UNIX, Java, or any other source code language. Development of the texturizing module 634 may be with Microsoft® Visual Studio, J Builder from Borland, C++ Builder from Borland or any other development tools. In other examples, other forms, formats and/or tools may be used to develop the instructions in the texturizing module 634.

The texture engine 1002 may include instructions to provide the overall operational functionality of the texturizing module 634. In addition, the texture engine 1002 may coordinate the cooperative operation and control of the library component 1004 and the graphical user interface component 1006. The texture engine 1002 allows the texturizing module 634 to operate on platforms such as Windows® 9x, NT, 2000 and XP or any other platform with or without network access. Accordingly, in one example, the user interface of the texturizing module 634 may have a "windows like" look and feel. The texturizing module 634 may be designed for operation by users such as architects, designers, etc., and therefore may not require the expertise of a software developer to operate. In addition, the texturizing module 634 may be equipped with safeguard features providing protection from detrimental events initiated erroneously by untrained users.

The library component 1004 represents the texture library and may catalog textures that are the basic elements of the texturizing module 634 in the texture library. The example library component 1004 includes a source texture category 1008 and a complex texture category 1010 that indicate the types of textures that may be cataloged. In other examples, the types of textures may be cataloged in greater or fewer numbers of categories. In addition, the library component 1004 may include a texture directory 1012.

As used herein, the term "texture" or "textures" refers to a realistic representation of the actual color(s) and/or feature(s) that are visually perceived on one or more surfaces of an object. Accordingly, the "texture" applied to a surface(s) of an object represented in electronic form almost replicates the feature(s) on the surface(s) of the object that would be visually perceived when viewing the actual object. For example, the texture of the surface of a building may include windows, sculptures, moldings, railings, holes, brickwork, shingles, etc. The texture may also represent a surface that is wet, shaded and/or sunny as well as representing reflected light, light images projected onto the surface(s), etc. Thus, texture may be used to replicate or almost reproduce structural features, artistic features, lighting and any other visual features present on one or more surfaces of an object, as if the actual object were being observed.

The source texture category 1008 includes at least one source texture. A source texture is an image in electronic form that may be stored in the source texture category 1008. The image may be in the form of an image file such as a bitmap, a JPEG, a TIF, a DWG or any other electronic form of an optical depiction of a person, an object or any other visually perceived subject matter. Pixels present within the electronic form of the image may be red, green, blue and transparent to represent the texture of the image. For example, a source texture may be created from a digital photograph taken with a digital camera. An example of a source texture is a bitmap image of the facade of a building.

The complex texture category 1010 includes complex textures. Complex textures are composed of one or more source textures. The complex textures are represented within the complex texture category 1010 with a transformation procedure. The transformation procedures may be stored in the complex texture category 1010. The transformation procedure provides manipulation and/or combination instructions that are applied to one or more source textures in the source texture category 1008 to form one or more complex textures.

Accordingly, the complex textures include references to source texture(s) from which the complex textures are composed.

Transformation of one or more source textures based on a transformation procedure may include one or more graphic operations performed on one or more source textures. The graphic operations may include for example, clipping, colorizing, rotating, mirroring, repeating, scaling, positioning, ordering, and/or any other graphically related manipulation of one or more source textures.

Figure 11:
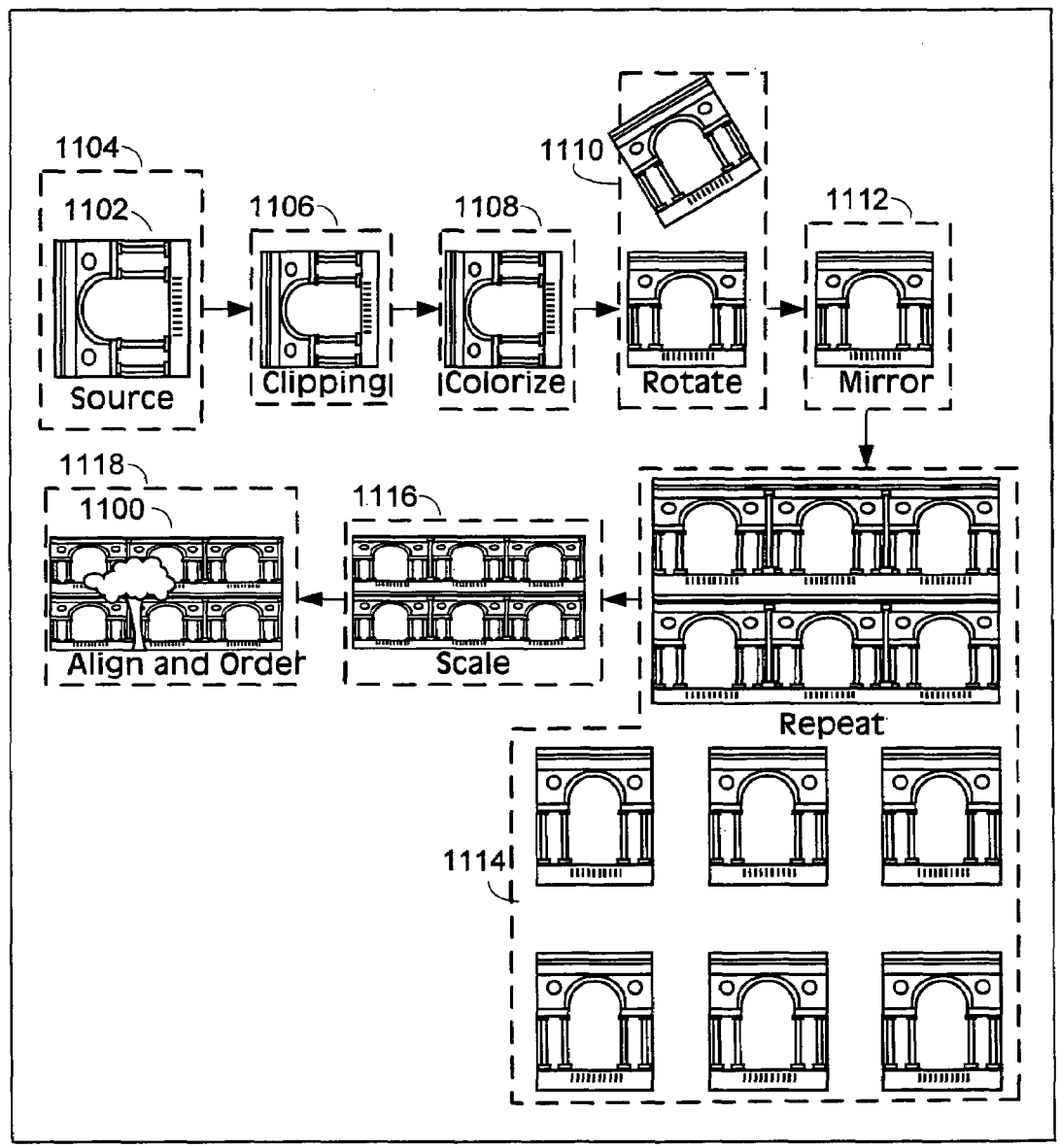
FIG. 11 is an example graphic operation process performed with the texturizing module of FIG. 10.

FIG. 11 illustrates the results of each graphic operation within an example transformation procedure to compose a complex texture 1100 using a source texture 1102. The source texture 1102 is identified by the transformation procedure at block 1104. Clipping is applied by the transformation procedure at block 1106 since only a part of the source texture 1102 is needed. At block 1108, colorizing is applied by the transformation procedure by multiplying the source texture with one or more colors. The source texture 1102 is rotated by the transformation procedure at block 1110. In the illustrated example, the source texture 1102 is rotated in almost 90 degree steps such that the space between the rotated source texture 1102 and the new bounding rectangle is filled with transparent color. In other examples, the rotational steps may be larger or smaller.

At block 1112, the source texture 1102 is mirrored on the x and y-axis. The source texture 1102 is repeated multiple times along the x and y axis at block 1114. The repeated source textures 1102 may be contiguous. Alternatively, a gap filled with transparent color may be defined between each of the repeated source textures 1102. At block 1116, the repeated source textures 1102 are scaled along the x and y-axis. The scaling may be performed without filtering. Alternatively, the scaling may be performed using bilinear filtering or any other scaling or filtering technique.

The transformed source textures 1102 may be positioned by alignment and ordering to form at least a portion of the complex texture 1100 at block 1118. Accordingly, multiple transformed source textures 1102 may be aligned to create the complex texture 1100. The multiple transformed source textures 1102 may be aligned contiguous with one another. Alternatively, two or more transformed source textures 1102 may be aligned to overlap. Where there are overlapping source textures 1102, an overlap order may be designated as part of the transformation procedure. The overlap order provides a particular order in which the transformed source textures 1102 are placed to form the complex texture 1100.

The complex texture 1100 may initially be filled with black and/or fully transparent textures. The source textures 1102 may be transformed and positioned within the complex texture 1100 according to a determined logic equation(s). For example, the logic equations for transformation of the source texture 1102 may be:

$$R0 = R0*(1-A1) + R1*A1$$

$$G0 = G0*(1-A1) + G1*A1$$

$$B0 = B0*(1-A1) + B1*A1$$

$$A0 = A0*(1-A1) + A1*A1 \quad \text{(EQUATION 1)}$$

Where $R0$, $G0$, $B0$, $A0$ are the colors (R=red, G=green, B=blue) and transparency (A) of the complex texture 1100 and $R1$, $G1$, $B1$, $A1$ are the color and transparency of the source texture 1102. In this example, the color and transparency of the source texture 1102 is in a range of about 0.0-1.0.

In FIG. 10, the texture directory 1012 may provide a tree structure for the texturizing module 634. The tree structure of the texture directory 1012 may provide a catalog of identifiers. Directories within the texturizing module 634 may be designated with a unique directory identifier within the texture directory 1012. The unique directory identifier may be any combination of integers and/or letters that are unique to a particular directory. In addition, within each of the directories, a unique texture identifier may be designated for at least one source texture(s) and/or at least one complex texture(s). The unique texture identifier may similarly be any combination of integers and/or letters to uniquely identify textures. The unique directory and texture identifiers may be assigned when a directory is created, a source texture is stored or a complex texture is formed with a transformation procedure.

Figure 12:
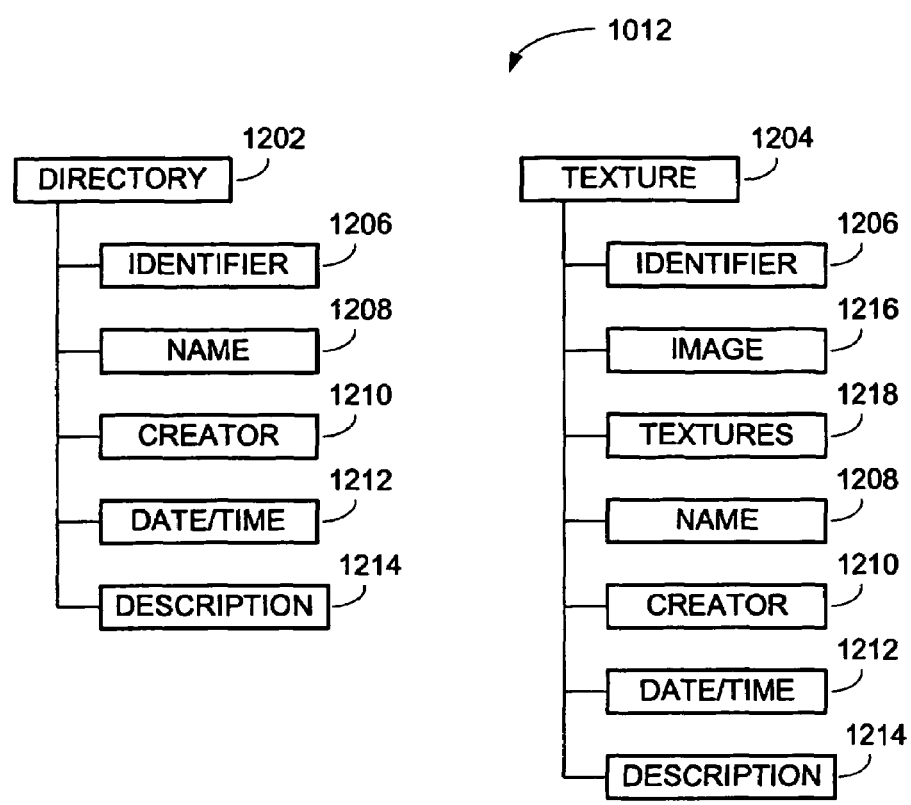
FIG. 12 is an example texture directory within the texturizing module of FIG. 10.

FIG. 12 is an example texture directory 1012. The illustrated texture directory 1012 includes at least one unique directory 1202 and at least one unique texture 1204. The directory 1202 includes attributes in the form of an identifier field 1206, a name field 1208, a creator field 1210, a date/time field 1212 and a description field 1214. In other examples greater or fewer numbers of fields of any type may be included in the directory 1202 to enable description and administration of the texture directory 1012.

The identifier field 1206 may include the unique directory identifier in the form of numbers and/or letters in a unique configuration. The unique directory identifier may be generated when the directory is created. The directory identifier uniquely identifies the directory 1202 and does not change. The name field 1208 may be a term that is descriptive of the directory 1202 such as, "roof tops." The creator field 1210 may include the name of the user who created the directory. The date/time field 1212 may include the date and time when the directory 1202 was created. The description field 1214 may briefly describe the contents of the directory 1202.

The texture 1204 may also include attributes to allow identification and administration of the textures. In the illustrated example, the texture 1204 includes an identifier field 1206, a name field 1208, a creator field 1210, a date/time field 1212 and a description field 1214 that are similar to the directory 1202, but are related to a texture instead of a directory. The texture 1204 may also include an image field 1216 and a textures field 1218. In other examples, fewer or greater numbers and types of fields may be included.

Within the image field 1216 the name of an image file, such as a bitmap file (*.bmp) may be identified. The identified image file may be a source texture for an object. The image file may be the unique texture 1204 associated with the unique texture identifier in the identifier field 1206. Alternatively, the image field 1216 may be blank and the textures field 1218 may include a unique identifier of a transformation procedure in the complex texture category that invokes transformation of one or more source textures to form one or more complex textures.

An example texture directory 1012 (FIG. 10) may include a root directory of the library component 1004 that has the unique directory identifier 00000000 (unsigned long zero). Other directories 1202 and textures 1204 may be formed under the texture directory 1012. An example of a small library is illustrated in Table 1.

TABLE 1
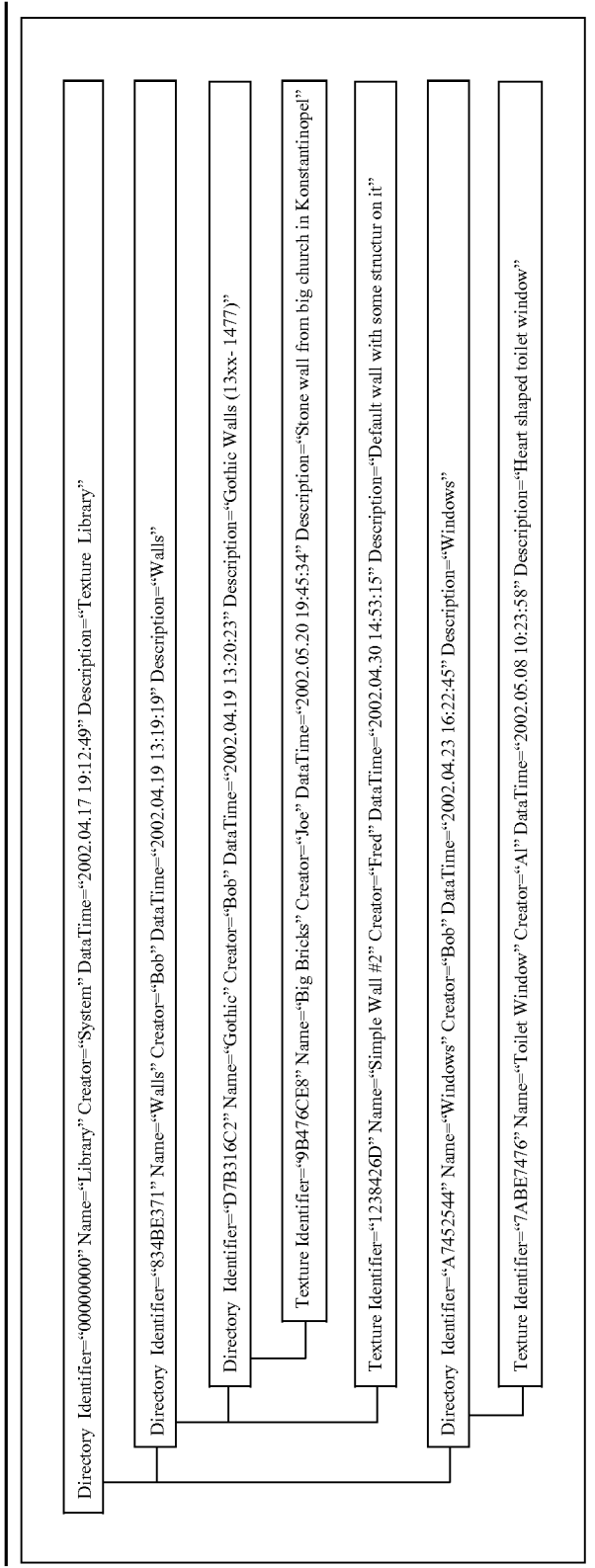

In FIG. 10, the graphical user interface (GUI) component 1006 may include a texture selection component 1014, a source texture operations component 1016 and a complex texture composition component 1018. The GUI component 1006 may be implemented using software such as Windows® APL Microsoft® Foundation Classes, KDE from Linux, Zinc™ from WindRiver® or any other GUI related software. In other examples, additional or fewer components may be included to illustrate the functionality of the GUI component 1006.

The texture selection component 1014 may include instructions to select textures. For example, selection may involve extracting textures from, or inserting textures into, the library component 1004. Selection of textures may be performed with a selection screen. The selection screen may provide capability to select textures based on selecting from the tree structure of the texture directory 1012. In addition, the selection screen may provide the capability to select textures based on a search, such as a Boolean search, of one or more of the previously discussed texture attributes. The texture attributes search engine may be part of the texture selection component 1014.

Figure 13:
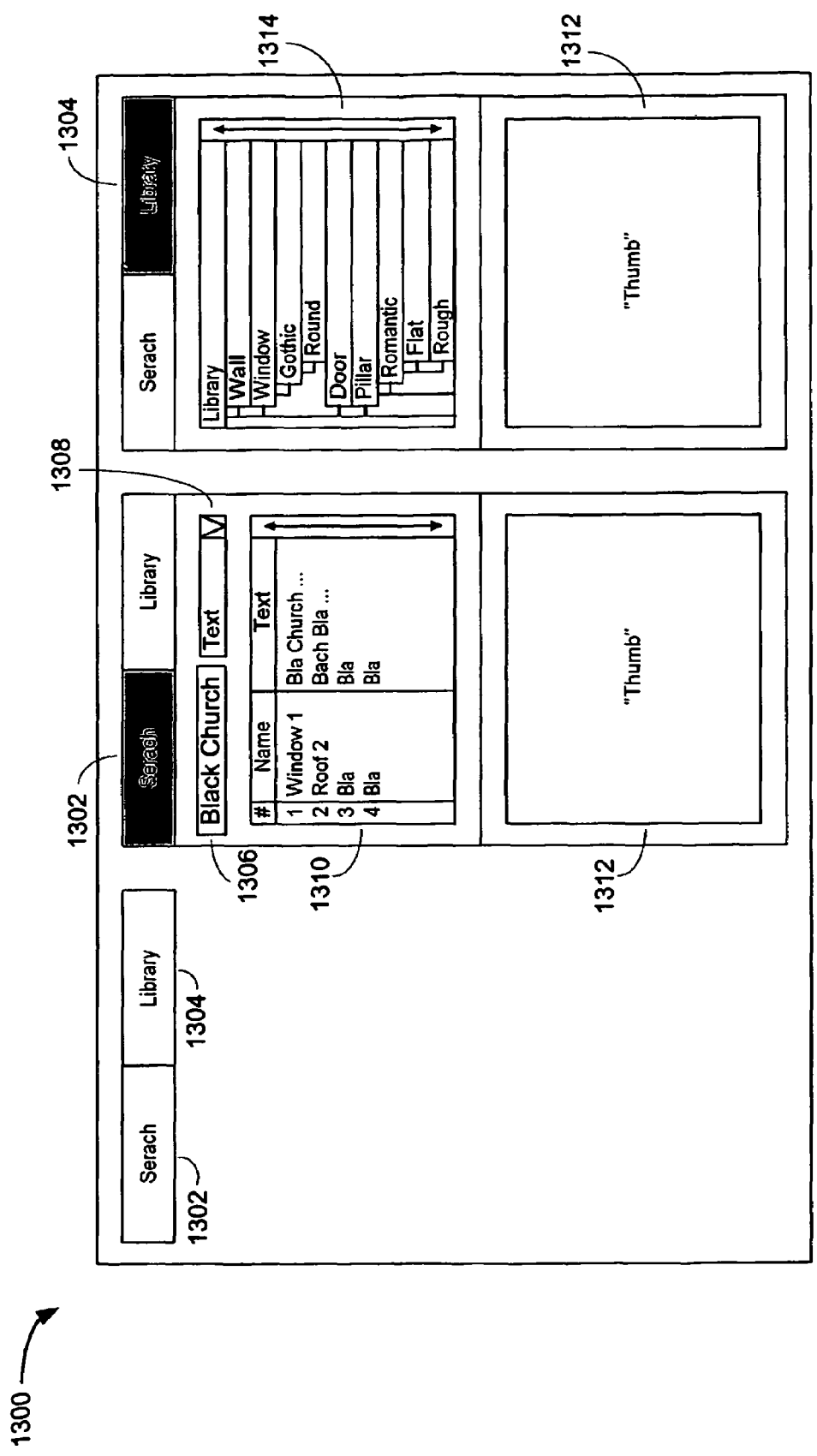
FIG. 13 is an example texture selection display generated with the texturizing module of FIG. 10.

FIG. 13 illustrates an example of the selection display 1300. The selection display 1300 includes a first mode that is a search mode 1302 and a second mode that is a library mode 1304. When the search mode 1302 is selected, a user may enter one or more search terms in a search term entry 1306 and select one or more fields of search from a pull down menu that is a search field selector 1308. The search results may be displayed in a results window 1310. In the illustrated example, a "text" type search with the search term "black church" provided two textures in the results window 1310 named: "Window 1" and "Roof 2," along with the associated text identified during the search. Upon selection of one of the textures from the results window 1310, a small scale image of the texture may be displayed in a thumb view 1312. From the thumb view 1312, the selected texture may be for example, dragged and dropped or double clicked to add to a complex texture.

When the library selection 1304 is selected, the tree structure of the textures within the texture directory 1012 (FIG. 10) may be displayed in a tree structure window 1314. A user may scroll, as well as open and close, parts of the tree structure within the tree structure window 1314. By selecting one of the textures from the tree structure window 1314, a small scale image of the texture maybe displayed in the thumb view 1312.

Also in FIG. 10, the source texture operations component 1016 may provide instructions that allow for the display and configuration of the transformation of source textures to build complex textures. More specifically, the source texture operations component 1016 may perform clipping, colorizing, rotating and mirroring of source textures. Preparation of this portion of the transformation procedure may be created using a source texture manipulation display.

Figure 14:
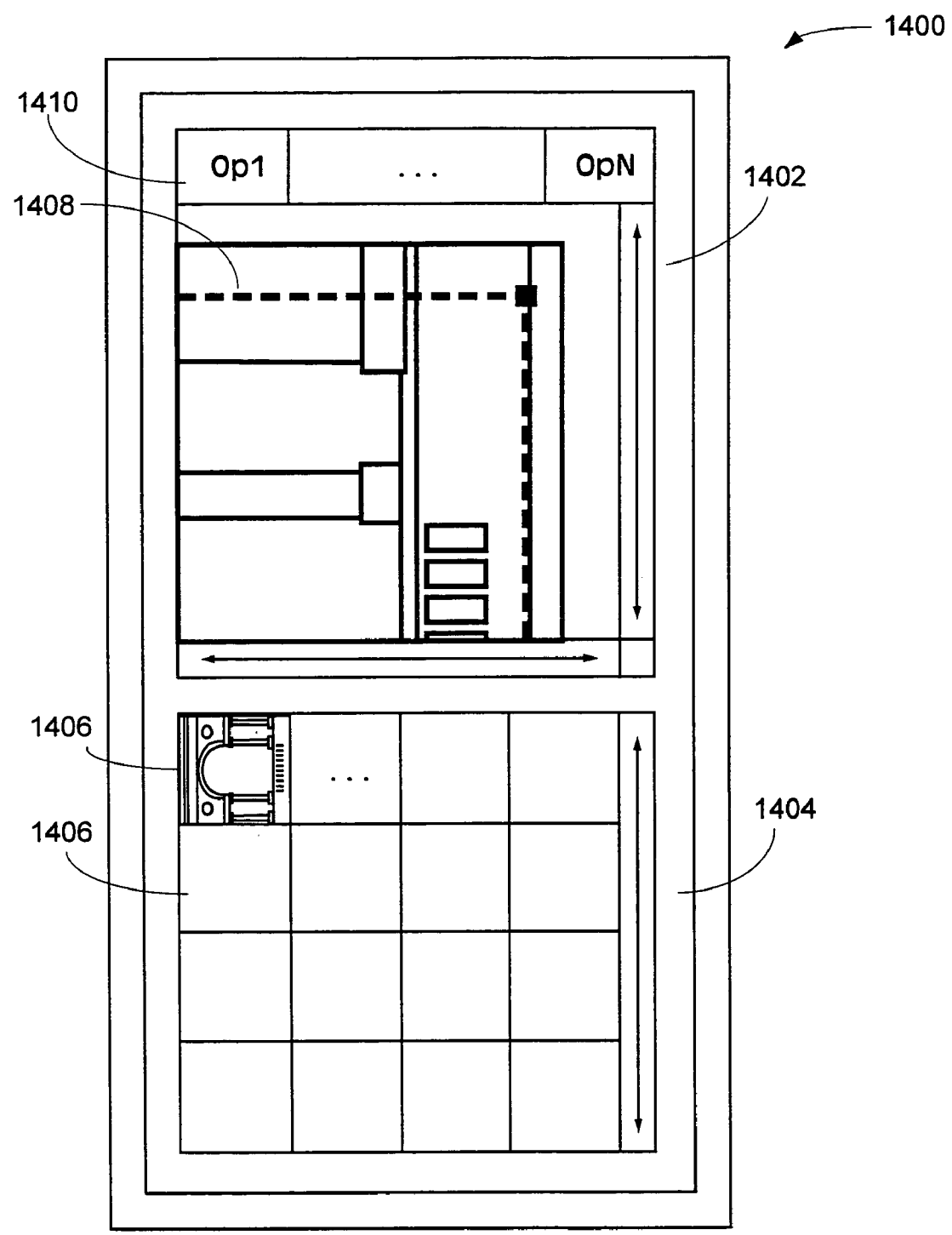
FIG. 14 is an example source texture manipulation display generated with the texturizing module of FIG. 10.

FIG. 14 is an example source texture manipulation display 1400. The source texture manipulation display 1400 includes a work space 1402 and a source texture selection space 1404. The work space 1402 may display a source texture selected from the source texture selection space 1404. The source texture selection space 1404 may display one or more images of different source textures each in a thumb view 1406. The source textures displayed in the source texture selection space 1404 may be source textures selected with the texture selection component 1014 (FIG. 10).

The currently selected source texture that is shown in the work space 1402 may be manipulated to perform transformation of the source texture. Manipulation may include setting up a clipping rectangle 1408 with respect to the selected source texture. The entire source texture or a selected portion of the source texture may be enlarged (e.g., zoomed) and scrolled within the work space 1402 to allow the user to precisely set up the clipping rectangle 1408. The clipping rectangle 1408 may be used to perform clipping, rotation and mirroring operations of the source texture within the work space 1402. Textures displayed in the thumbs views 1406 in the source texture selection space 1404 may be moved to the work space 1402 by a drag and drop operation or double clicking selection using a relative or absolute pointing device.

The work space 1402 may also include a tool bar 1410. The tool bar 1410 may include selector buttons (identified as OP1 to OPn) for performing transformation of the source texture. The selector buttons may be designated for the various manipulative operations that may be performed during transformation of the source texture. For example, selector buttons may be designated to support the operations of clipping, colorizing, rotating and mirroring of source textures. In other examples, other forms of easy access commands to invoke various manipulative functions within the work space 1402, such as particular keyboard entries or voice commands, may be employed.

Each transformation operation performed on a source texture may be captured and stored by the source texture operations component 1016 as part of a source transformation procedure. The source transformation procedure for each source texture may be associated with the transformed source texture. Accordingly, when the transformed source texture is used to form a complex texture, the associated source transformation procedure may be made part of the transformation procedure used to form the complex texture.

The source transformation procedure may be a set of executable instructions. The unique ID of the source texture(s) may be included in the source transformation procedure. Thus, the source transformation procedure and not the transformed image may be stored and accessed to generate the transformed image. The processor 626 may recreate the image by executing the instructions in the source transformation procedure.

Also in FIG. 10, the complex texture composition component 1018 may provide instructions allowing a user to form a complex texture from one or more source textures. A complex texture may be formed by transforming one or more of the source textures. Formation of a complex texture may be accomplished with a complex texture formation display.

Figure 15:
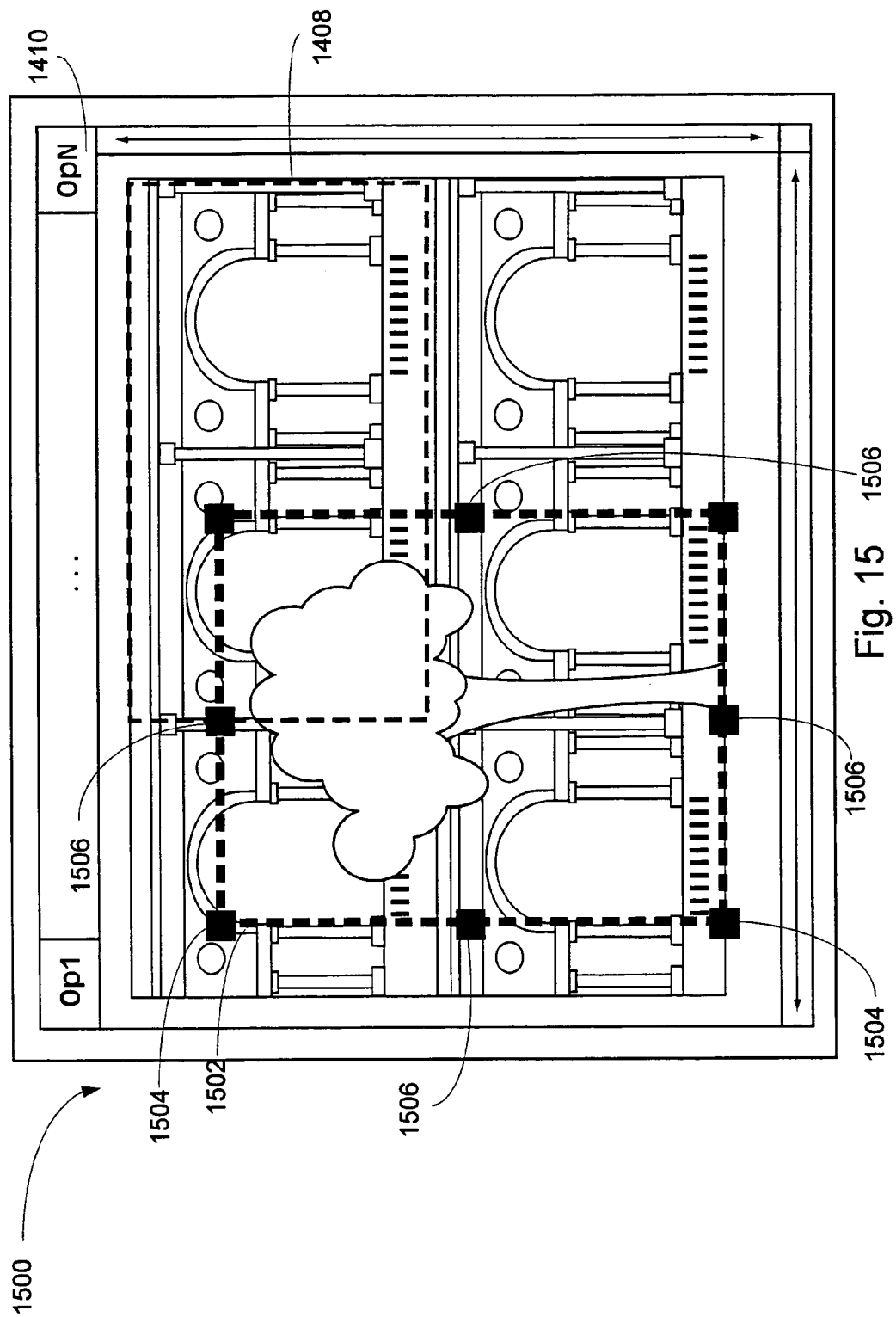
FIG. 15 is an example complex texture formation display generated with the texturizing module of FIG. 10.

FIG. 15 is an example of a complex texture formation display 1500. A complex texture is depicted in the example complex texture formation display 1500. The entire complex texture or a selected portion may be zoomed and scrolled with the complex texture composition component 1018 (FIG. 10). In addition, instructions in the complex texture composition component 1018 may be initiated through select and arrange one or more source textures to form the complex texture. Selection and arrangement of the source textures may involve transformation of the source textures. Source textures that have been transformed may also be locked/unlocked with instructions executed in the complex texture formation display 1500. The source textures that have been transformed to a desired state may be locked to avoid accidental changes.

Instructions within the complex texture composition component 1018 (FIG. 10), may support the repeating, scaling, positioning and ordering transformations of source textures. The complex texture composition component 1018 may also capture and store each of the transformation operations as part of a complex transformation procedure. The complex transformation procedure may similarly include unique texture identifiers of the source textures and instructions to perform the transformation of the source texture. Alternatively, the complex transformation procedure may be associated with the complex texture by appending the source transformation procedure(s) (if any) associated with the source textures. In yet another alternative, the complex transformation procedure may be associated with the complex texture as an additional transformation procedure.

Performing transformations with the complex texture composition component 1018 (FIG. 10) may include editing the complex texture using the clipping rectangle 1408 (FIG. 14) and/or a source texture bounding rectangle 1502. The source texture bounding rectangle 1502 may be used to perform scaling and positioning transformations as well as to create corresponding complex transformation procedures. Included with the example source texture bounding rectangle 1502 illustrated are corner points 1504 and center points 1506. Horizontal and vertical lines extend between the corner points 1504 and the center points 1506 to define the size of the source bounding rectangle 1502. The corner points 1504 and the center points 1506 may be used to adjust the size of the source bounding rectangle 1502 by clicking and dragging the corner points 1504 or the center points 1506. The source bounding rectangle 1502 may also automate the process of manipulating adjacently located textures to be in contact with each other.

The transformation procedures of repeat and ordering may also be performed by the complex texture composition component 1018 (FIG. 10). The repeat transformation procedure may be controlled by selector buttons of the tool bar 1410 or some other functionality associated with the complex texture formation display 1500. A gap size between the repeated source textures may also be altered with the complex texture composition component 1018. In addition, the ordering transformation procedures that indicate which source texture is drawn first may also be set/altered with the complex texture composition component 1018.

The complex texture may be further supported by under laying a background image, such as a photograph taken with a digital camera or other image capturing devices. The background image may be shown in the background without mixing with the complex texture. For example, an image of the front side of an adjacently located building may be added to the background of a complex texture that represents a building being scanned. The background image may similarly be scaled and positioned relative to the complex texture. In addition, a complex transformation procedure may be created for the background image.

Upon completion of the complex texture, the source transformation procedure(s) and the complex transformation procedure may be combined to form one transformation procedure. The transformation procedure may include unique texture identifiers for all the source textures used to form the complex texture. In addition, the transformation procedure may include logic instructions to selectively manipulate the source textures to form complex textures. Accordingly, instead of storing the actual complex texture as an image file, the corresponding transformation procedure(s) may be assigned a unique texture identifier and categorized in the texture directory 1012. (FIG. 10)

Figure 16:
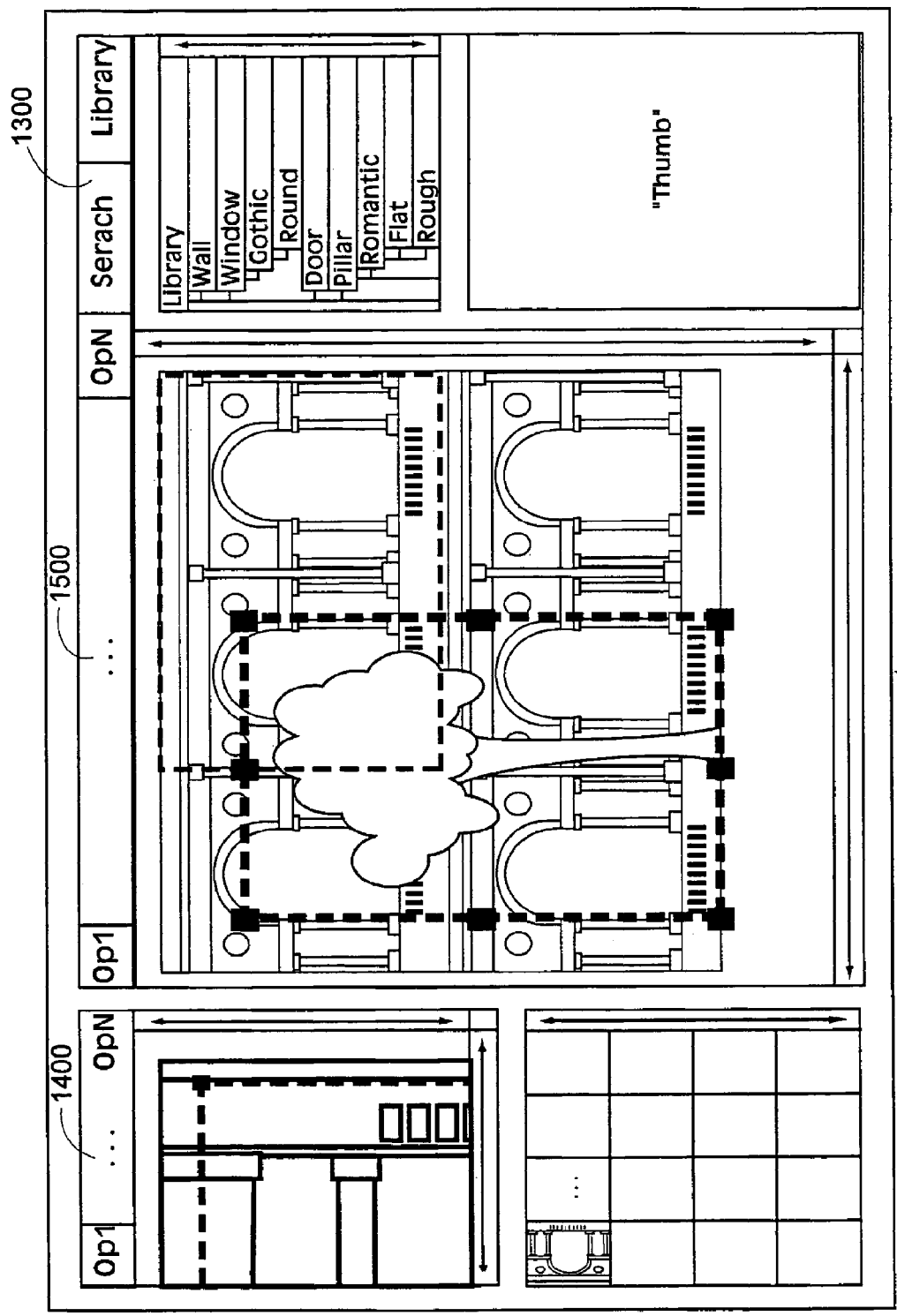
FIG. 16 is an example texture maker display generated with the texturizing module of FIG. 10.

FIG. 16 is an example texture maker display 1600 that includes the selection display 1300, the source texture manipulation display 1400 and the complex texture formation display 1500. Accordingly, source textures may be identified, transformed and manipulated to form complex textures using a single display. In other examples, the texture maker display 1600 may be arranged differently or may have some other combination of the previously discussed displays.

In addition to the previously discussed texture related operations, additional functionality may also be available from instructions in the texturizing module 634 (FIG. 6). The additional functionality may be available from a display menu or other user interfaces. Such functionality may include the capability to create new complex textures. The creation of a new complex texture may include selecting properties for the texture such as the size, transformation procedures and any other texture related information. In addition, a new source texture may be created from a copy of an existing complex texture utilizing some or all of the associated properties of the existing complex texture. Following execution of transformation procedures to create the complex texture in the form of an image, the image may be stored as a source texture.

Functionality within the texturizing module 634 may also include a capability to edit the size, transformation procedures and/or any other information associated with a texture. Other information may include, for example, the information in the previously discussed layers of the three-dimensional electronic model. The texture size and other properties may be edited at any time. Additional functionality may include the capability to perform saving/loading operations, preference selection capability, tool tips and a help menu.

The texturizing module 634 may also include instructions to support synchronization of the textures and the library structure within a client server architecture. The texturizing module 634 may operate on a server computer and also on any number of client computers. The server may be accessible by users with one of the client computers.

The textures and library structure may be maintained by instructions in the library component 1004 (FIG. 10) using any technique to avoid the creation of multiple versions of a texture or library structure. Multiple versions may be created when a texture or library structure is modified in parallel by two users. An example technique to avoid multiple versions involves a single user process. With the single user process, when one or more textures and/or portion of the library structure is being modified by one user, instructions in the library component 1004 may deny other users access to those one or more textures and/or portions of the library until the single user finishes the modifications.

Alternatively, a synchronization process may be implemented. Synchronization of the work of various users within the texturizing module 634 may be coordinated by instructions in the library component 1004. As multiple users create and use textures, the users may be synchronized with each other via the server.

The work of each user may be stored locally in a local texture library on the user's client computer using instructions in the library module 1004 (FIG. 10). The server may also include the library module 1004 with capability to store the work of all users in a master texture library. The user/client may use the client computer to connect to the server and both libraries (master and local) may be synchronized. The user may then disconnect from the server. Thus, there is no steady connection. As used herein, the term "connection" refers to the client establishing communication with the server over a medium such as a network, using a TCP/IP protocol through a publicly accessible network, such as the Internet and/or a LAN with a login procedure (such as a user password schema). The parameters for forming the connection may be part of a preference menu.

During the synchronization process the unique identifier associated with each directory and texture and the date/time may be used. The unique identifier may be used to detect which parts of the texture directory are the same in the local library and the master library. In addition, the date/time may be used to determine which texture and/or directory is newer.

For example, the master and local library may both include the information provided in Table 2.

TABLE 2
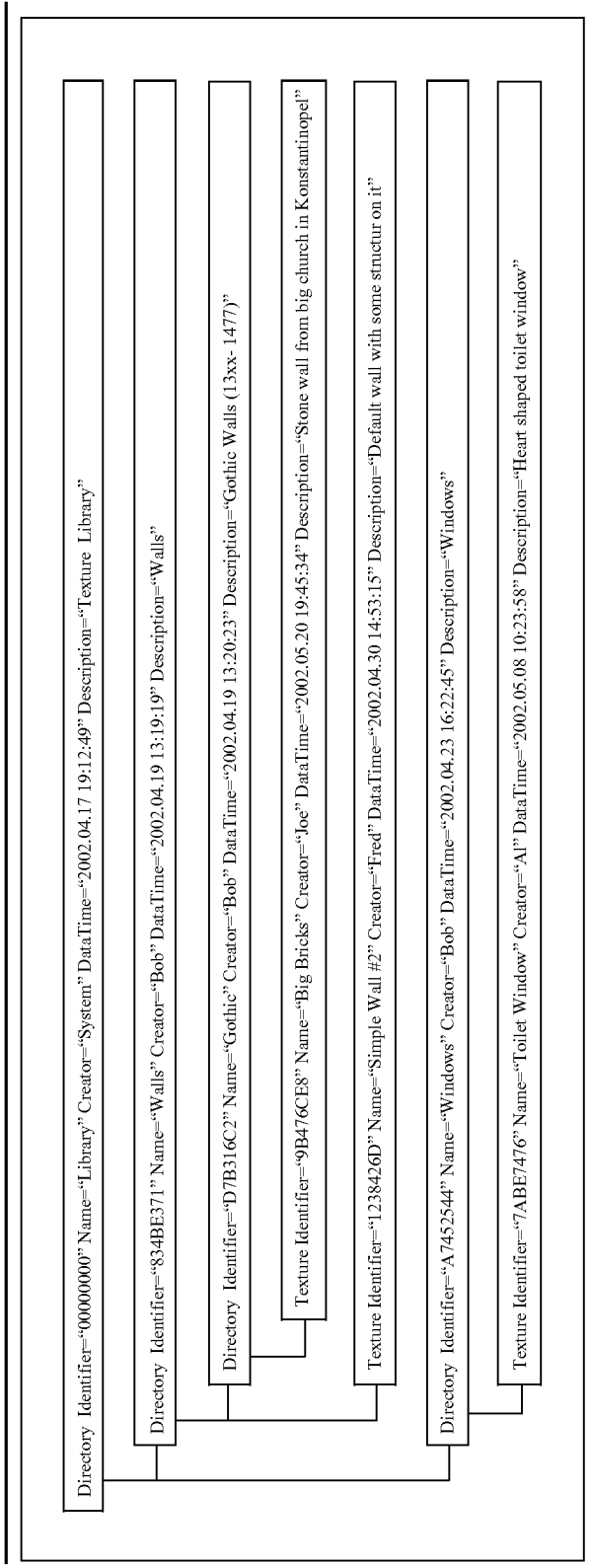

A first user then performs modifications to the local library. The modifications include creating a new texture with unique identifier "8E1BC531", changing the directory location of an existing texture uniquely identified as "1238426D" and changing the description of another existing texture uniquely identified as "9B476CE8" as depicted in Table 3.

TABLE 3

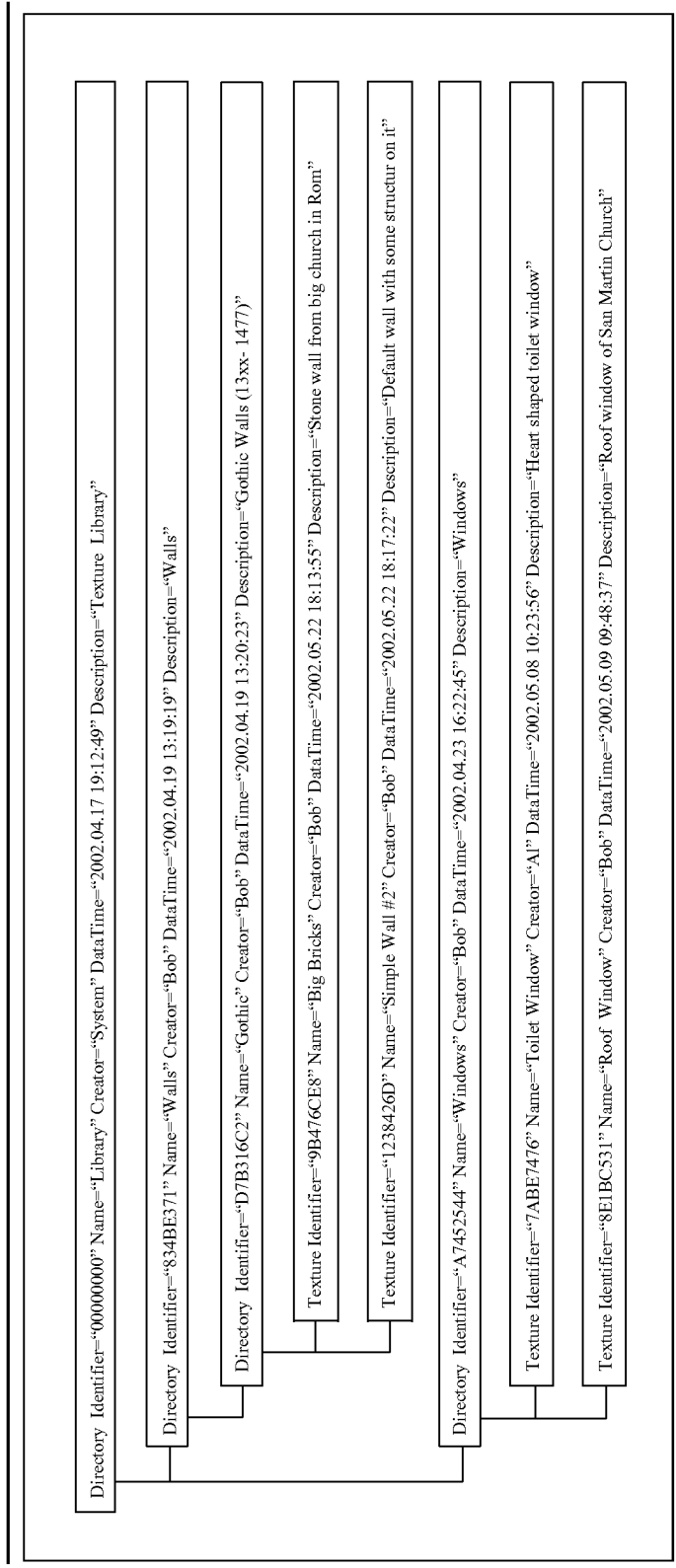

Directory Identifier="00000000" Name="Library" Creator="System" DataTime="2002.04.17 19:12:49" Description="Texture Library"

Directory Identifier="834BE371" Name="Walls" Creator="Bob" DataTime="2002.04.19 13:19:19" Description="Walls"

Directory Identifier="1D7B316C2" Name="Gothic" Creator="Bob" DataTime="2002.04.19 13:20:23" Description="Gothic Walls (13xx - 1477)"

Texture Identifier="9B476CE8" Name="Big Bricks" Creator="Bob" DataTime="2002.05.22 18:13:55" Description="Stone wall from big church in Rom"

Texture Identifier="1238426D" Name="Simple Wall #2" Creator="Bob" DataTime="2002.05.22 18:17:22" Description="Default wall with some structur on it"

Directory Identifier="A7452544" Name="Windows" Creator="Bob" DataTime="2002.04.23 16:22:45" Description="Windows"

Texture Identifier="7ABE7476" Name="Toilet Window" Creator="Al" DataTime="2002.05.08 10:23:56" Description="Heart shaped toilet window"

Texture Identifier="8E1BC531" Name="Roof Window" Creator="Bob" DataTime="2002.05.09 09:48:37" Description="Roof window of San Martin Church"

Meanwhile, the master library has been updated by a second user. The second user updated the texture directory with a new texture uniquely identified as "175FC4EA" and also modified the texture identified as "9B476CE8" as illustrated in Table 4. The modifications to the texture identified as "9B476CE8" do not include changes to the description but rather the directory location and the composition of the texture.

TABLE 4

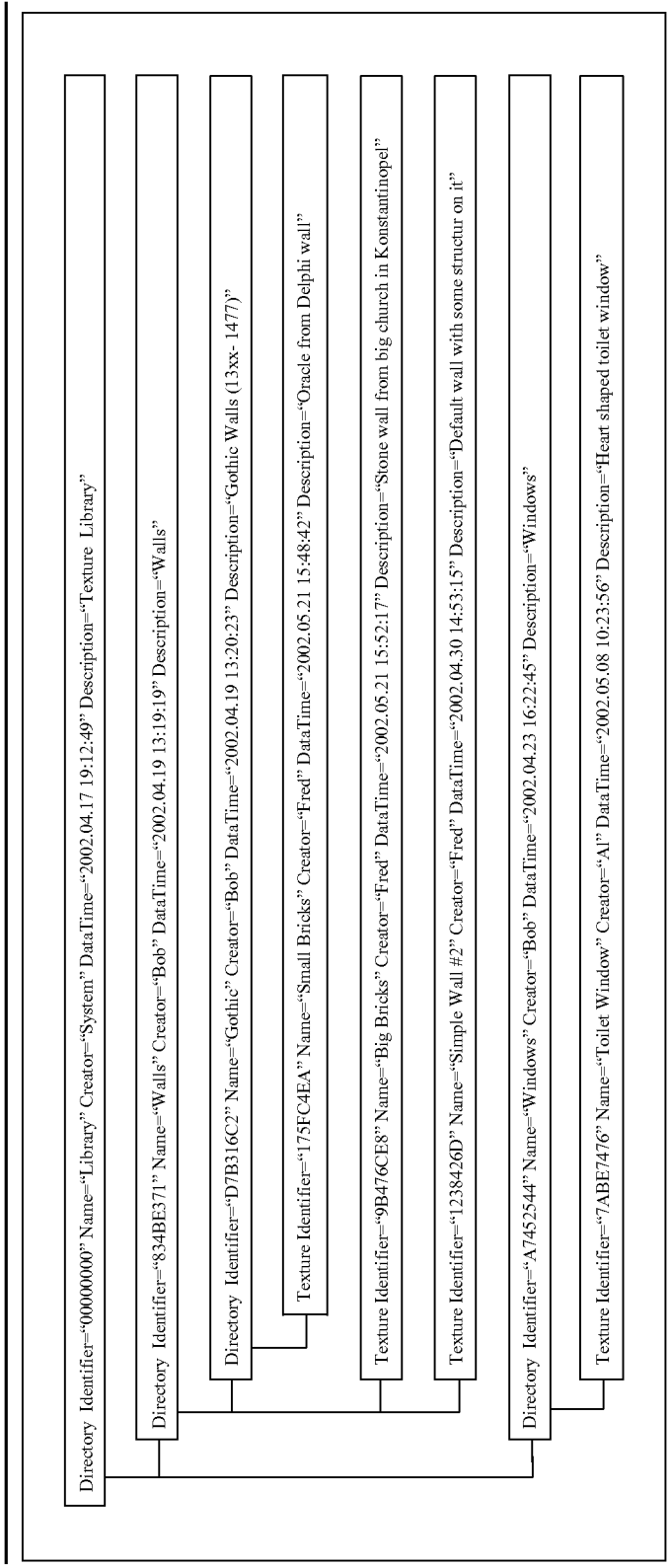

Directory Identifier="00000000" Name="Library" Creator="System" DataTime="2002.04.17 19:12:49" Description="Texture Library"

Directory Identifier="834BE371" Name="Walls" Creator="Bob" DataTime="2002.04.19 13:19:19" Description="Walls"

Directory Identifier="D7B316C2" Name="Gothic" Creator="Bob" DataTime="2002.04.19 13:20:23" Description="Gothic Walls (13xx- 1477)"

Texture Identifier="175FC4EA" Name="Small Bricks" Creator="Fred" DataTime="2002.05.21 15:48:42" Description="Oracle from Delphi wall"

Texture Identifier="9B476CE8" Name="Big Bricks" Creator="Fred" DataTime="2002.05.21 15:52:17" Description="Stone wall from big church in Konstantinopel"

Texture Identifier="1238426D" Name="Simple Wall #2" Creator="Fred" DataTime="2002.04.30 14:53:15" Description="Default wall with some structur on it"

Directory Identifier="A7452544" Name="Windows" Creator="Bob" DataTime="2002.04.23 16:22:45" Description="Windows"

Texture Identifier="7ABE7476" Name="Toilet Window" Creator="Al" DataTime="2002.05.08 10:23:56" Description="Heart shaped toilet window"

When the first user forms a connection with the server and synchronizes the local library of the first user with the master library, the resulting changes in the master library are illustrated in Table 5. Specifically, the newly created texture identified as "8E1BC531" is added at the specified directory location. In addition, the texture identified as "1238426D" is moved to the specified directory location. Further, the texture identified as "9B476CE8" (the texture changed by both the first and second users) is placed at the directory location specified by the second user. Texture "9B476CE8" includes the change in composition of the texture performed by the first user, and the new description changed by the second user. Thus, the texture identified as "9B476CE8" is a mix of both updates.

TABLE 5
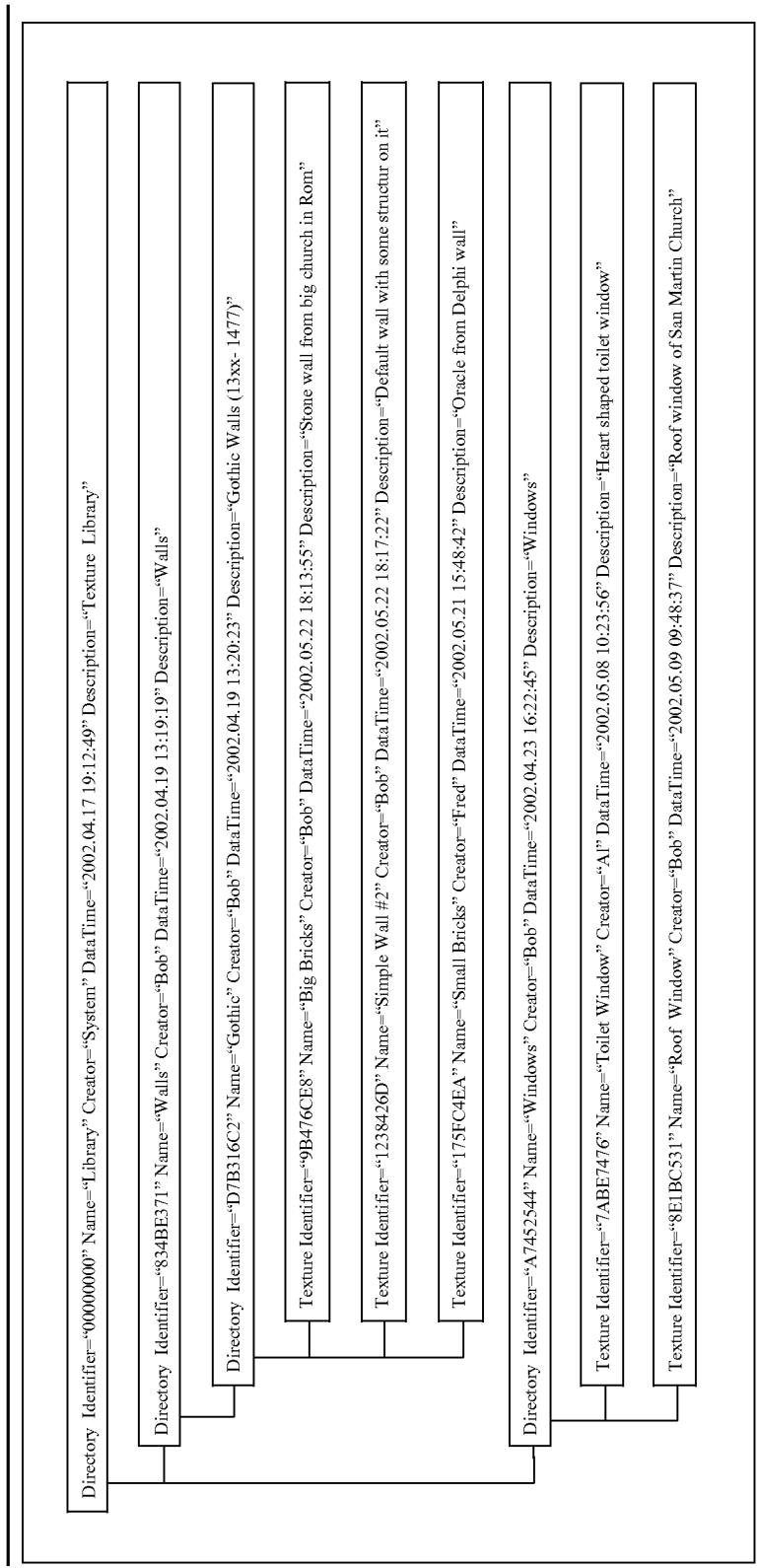

The updates by multiple users to the texture identified as "9B476CE8" may be performed automatically by the texturizing module 634. Alternatively, when the synchronization process occurs, the texturizing module 634 may determine that the version modified by the first user is more current. In addition, the texturizing module 634 may determine that the directory location and composition of the texture in the version modified by the first user are different. Further, the texturizing module 634 may determine that the first user did not change the directory location and composition in the version modified by the first user. Based on the determined conditions, the texturizing module 634 may set an inconsistency flag for each of the inconsistent attributes (texture, name and directory location) associated with the texture identified as "9B476CE8." In addition, the texturizing module 634 may generate a dialog box(es) requesting instruction from the first user.

The dialog box may show the inconsistent attributes and request the first user to decide which attribute should remain associated with the texture identified as "9B476CE8." The first user may then select the correct attribute. Alternatively, the first user may abort the synchronization process and take some other action, such as duplicate the texture identified as "9B476CE8" and provide another unique texture identifier. Similar actions may be performed regarding directories. In the case of inconsistent directories, however, only the texture name, description and the directory location may be the basis for inconsistencies.

To assure the uniqueness of the identifier for each texture, the server may allocate each user a group of unused identifiers during the synchronization process. The group may include a determined number of unique identifiers. The determined number of unique identifiers may be, for example, based on the memory allocated to store the data. If the address space of the identifiers is 32 bits for example, the size of the group may be 1024 bits or more.

Instructions within the texturizing module 634 operating on the server may include network communication capability and server administrator functionality. Communication capability may, for example, involve the server "listening" on a specific TCP/IP port waiting for a user operating a client computer to connect over the network. The server may run in the background and may have an icon in a system tray. By entering a command, such as by double clicking the icon, an administrator of the server may get a configuration dialog box with capability to create a new library, perform loads/saves/backups, import and/or export textures, select parameters related to the network communication and manage user names and passwords. The server may also export a group of unique identifiers in an identifier group file. The identifier group file may be imported by a user using a client computer with no network access to provide unique identifiers for textures created by that user within the local library of the client computer.

Figure 17:
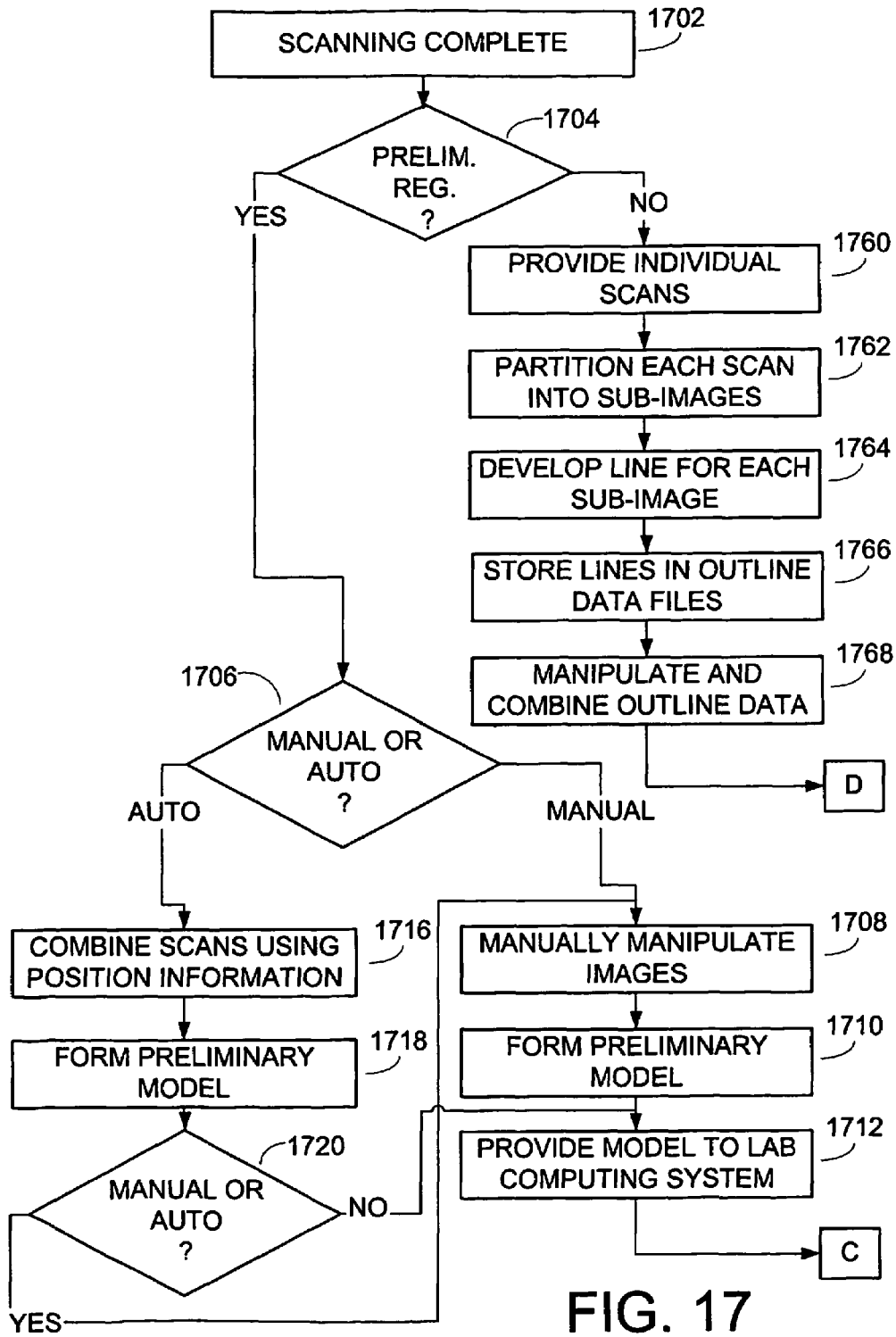
FIG. 17 is an example flow diagram illustrating operation of the computing system of FIG. 6 within the image generation system of FIG. 1.

FIG. 17 is a partial flow diagram illustrating the processing of three-dimensional electronic images to form a three-dimensional electronic model by the image generation system 100 illustrated in FIGS. 1 and 6. The operation begins at block 1702 when the scanning of an object is complete and the scan information (three-dimensional electronic images, associated position information, etc.) has been stored in the memory module 604 of the site computing system 106. At block 1704 it is determined if the site computing system 106 includes the preliminary registration module 610. If the site has the preliminary registration module 610, the user may select manual or automatic manipulation to combine the scans at block 1706. If a manual manipulation is selected, the user may move and rotate the three-dimensional electronic images individually while viewing the object at block 1708. At block 1710, the user may manually form a preliminary three-dimensional electronic model from the three-dimensional electronic images to match the object being viewed. When the manipulation is complete, the preliminary three-dimensional electronic model may be provided to the lab computing system 108 at block 1712.

If the automatic manipulation is selected at block 1706, instructions in the preliminary registration module 610 may be executed to use the position information to combine and manipulate the three-dimensional electronic images at block 1716. At block 1718, the preliminary three-dimensional electronic model may be formed. The user may decide whether additional manual manipulation is desired at block 1720. If manual manipulation is desired, the operation returns to block 1708. If manual manipulation is not desired, the operation proceeds to block 1712 to provide the preliminary three-dimensional electronic model to the lab computing system 108.

Figure 18:
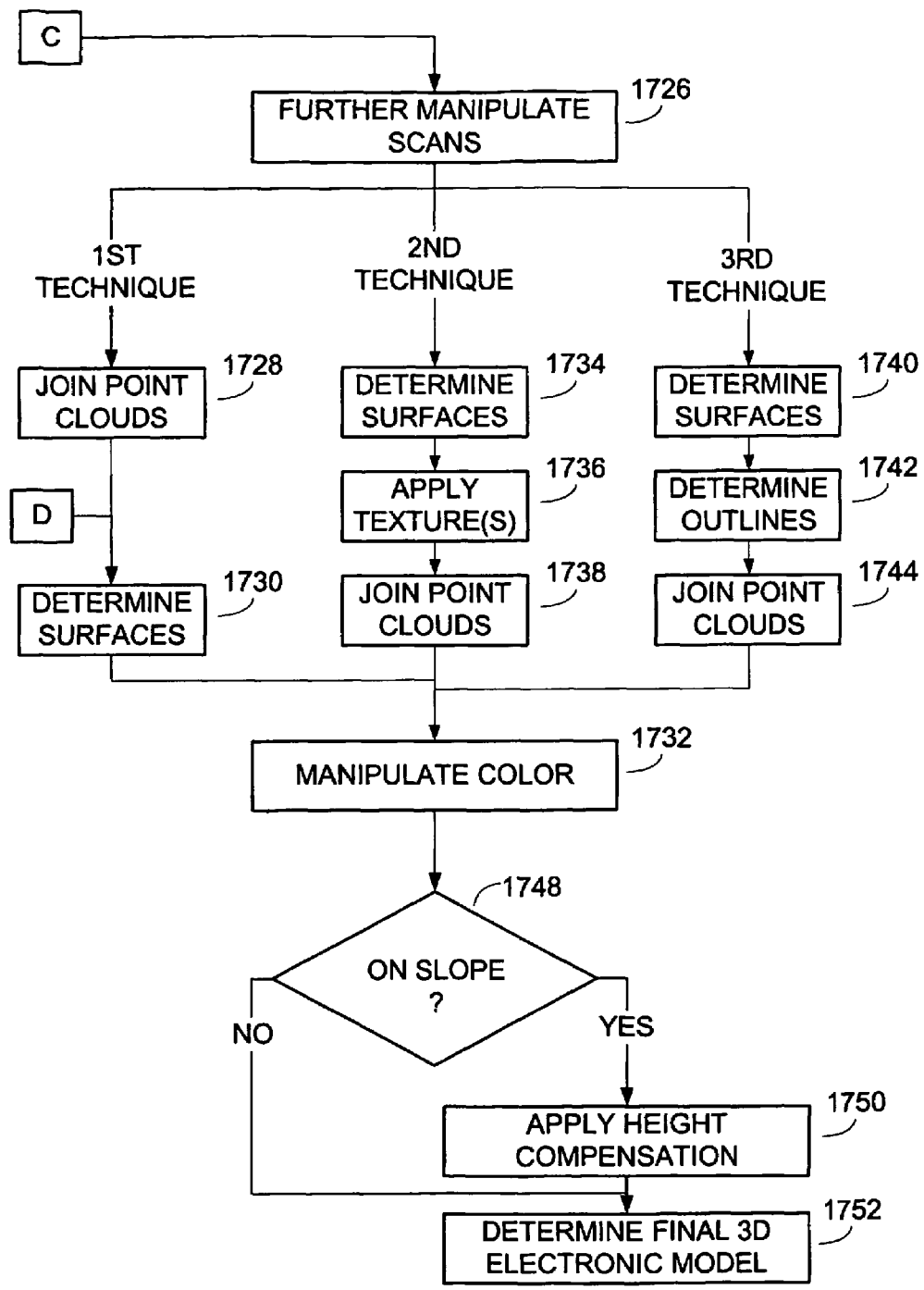
FIG. 18 is a second part of the example flow diagram of FIG. 17.

In FIG. 18, at block 1726, the three-dimensional electronic images that form the preliminary three-dimensional electronic model are manually and/or automatically manipulated further (precise registration) to improve the fit between the scans. When the precise registration involves the first technique, the point clouds of three-dimensional electronic images are combined to form the model point cloud by comparing the geometric points at block 1728. The model point cloud represents the three-dimensional electronic model. At block 1730, surfaces of the three-dimensional electronic model (the model point cloud) are determined. At block 1732, the color may be manipulated.

When the precise registration involves the second technique, surfaces of each of the three-dimensional electronic images (the point clouds) are determined at block 1734. At block 1736, texture is applied to the surfaces of each of three-dimensional electronic images. The three-dimensional electronic images are joined to form the three-dimensional electronic model based on the surfaces and/or the textures at block 1738. At block 1732, the color may be manipulated.

When the precise registration involves the third technique, surfaces of each of the three-dimensional electronic images are determined at block 1740. At block 1742, an outline of each surface is determined. The three-dimensional electronic images are joined to form the framework of the three-dimensional electronic model based on the outlines at block 1744. At block 1732, the color may be manipulated.

At block 1748, it is determined if the object that was scanned was set on a sloped resting surface. If the resting surface was sloped, a height compensation is applied at block 1750. At block 1752, the final three-dimensional electronic model is determined. If the resting surface is not sloped at block 1748, the operation proceeds to block 1752 to determine the final three-dimensional electronic model.

Referring again to block 1704 of FIG. 17, where the preliminary registration module 610 is not used or is unavailable, the information from each scan is provided to the lab computing system 108 individually at block 1760. At block 1762, each of the three-dimensional electronic images represented with a point cloud are partitioned into sub-images by the scan combining module 630. A line representative of a sub-image is developed for each of the sub-images at block 1764. At block 1766, the lines are each stored in an outline data file. The outline data files are then combined and manipulated to form the three-dimensional electronic model at block 1768. The operation then returns to block 1730 of FIG. 18 to complete formation of the three-dimensional electronic model.

Figure 19:
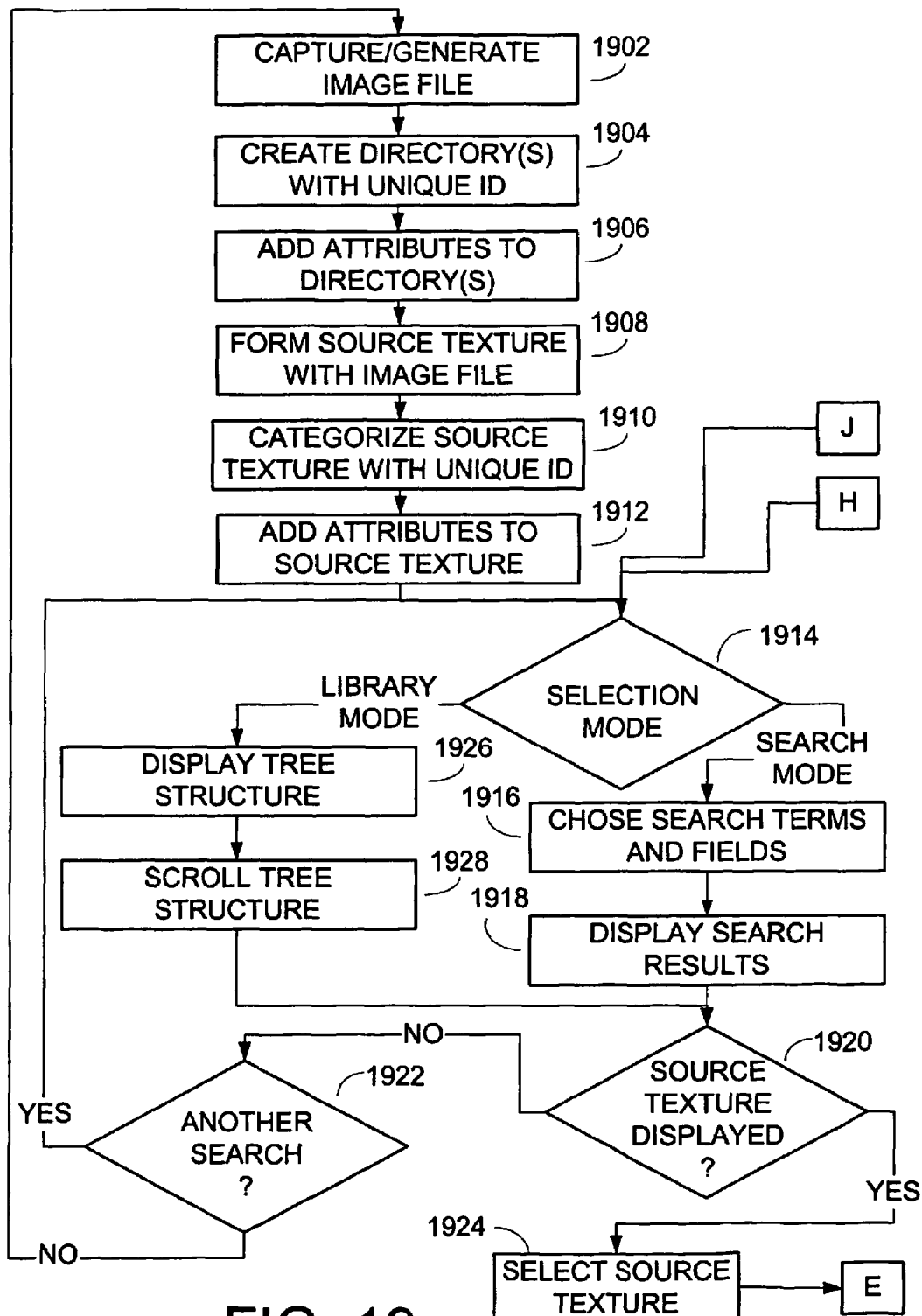
FIG. 19 is an example flow diagram illustrating operation of the texturizing module of FIG. 6.

FIG. 19 is a partial flow diagram illustrating the process to texturize a three-dimensional electronic model with the texturizing module 634 illustrated in FIGS. 6, 8 and 10. The operation begins at block 1902 where at least one image file representative of one or more textures present on the object that was scanned to create the three-dimensional electronic model is captured and/or generated. At block 1904, one or more directories are created and identified with unique identifiers within the texture directory 1012. Additional attributes are added to the directories at block 1906. At block 1908, the captured/generated image file(s) is used to form a source texture(s). Each source texture is categorized with a unique identifier in the source texture category 1008 at block 1910. At block 1912, additional attributes are added to the source texture(s).

The first mode or the second mode is used to identify and select a source texture at block 1914. If the first mode (search mode) is selected, search terms are entered and fields of search are chosen at block 1916. At block 1918, search results are displayed with the results window 1310. At block 1920 it is determined if there are source textures available within the displayed source textures that may be useable on the three-dimensional electronic model. If no source textures are available, it is determined if another search for source textures should be performed at block 1922. If no additional searching should be performed, the operation returns to block 1902 to capture and/or generate additional image file(s).

If additional searching should be performed, the operation returns to block 1914 to chose the selection mode. If there is a useable source texture displayed at block 1920, the source texture is selected from the search results for display in the thumb view 1312 at block 1924. If the second mode (library mode) is selected at block 1914, the tree structure within the texture directory 1012 is displayed in the tree structure window 1314 at block 1926. At block 1928, the user may search the tree structure, and the operation returns to block 1920 to identify one or more useable source textures from the display.

Figure 20:
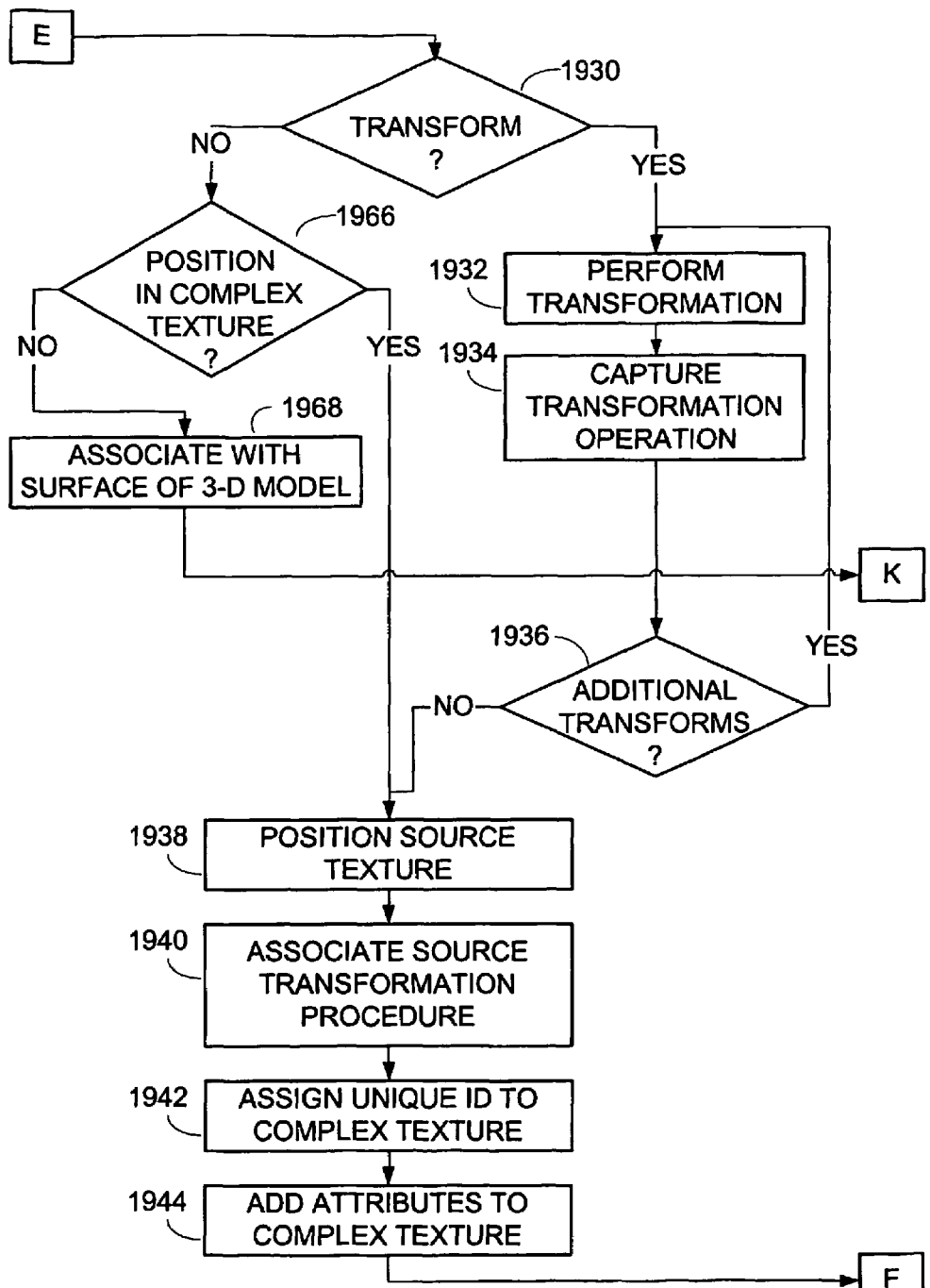
FIG. 20 is a second part of the example flow diagram of FIG. 19.

In FIG. 20, it is determined whether the source texture should be transformed at block 1930. If source texture should be transformed, a transformation operation is performed on the source texture using the source texture manipulation display 1400 at block 1932. At block 1934, the transformation operation that was performed is captured and made part of a source transformation procedure. At block 1936 it is determined if additional transformation operations should be performed on the source texture. If additional transformation should be performed, the operation returns to block 1932. If no additional transformations of the source texture are desired, the transformed source texture may be positioned within the complex texture formation display 1500 to form at least part of a complex texture at block 1938. At block 1940, the source transformation procedure may be associated with the complex texture. A unique identifier may be assigned to the complex texture to categorize the complex texture in the complex texture category 1010 at block 1942. At block 1944, other attributes may be added to the complex texture.

Figure 21:
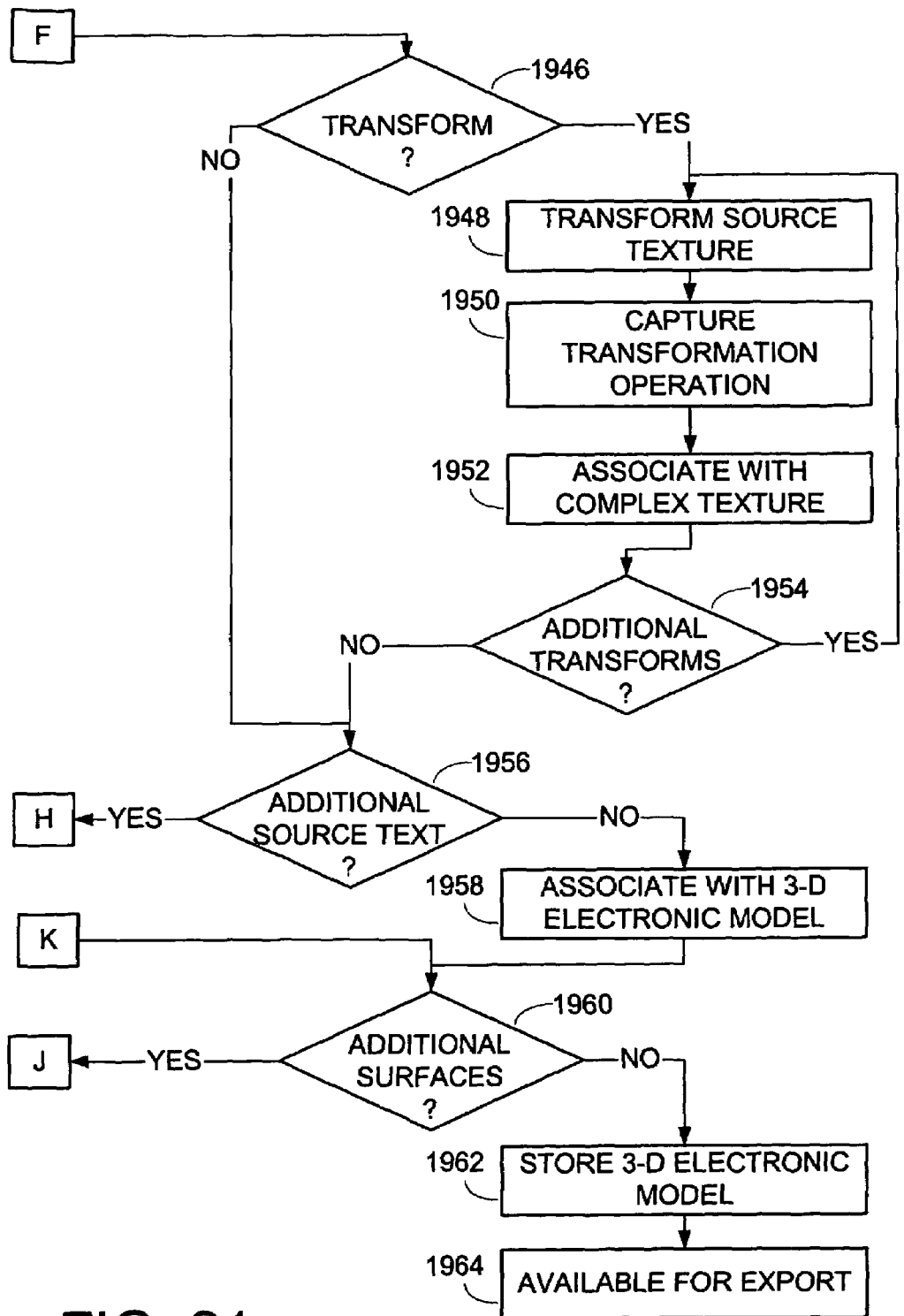
FIG. 21 is a third part of the example flow diagram of FIG. 19.

In FIG. 21, it is determined if transformations related to the transformed source texture are desired within the complex texture at block 1946. If transformations are desired, the transformed source texture is further transformed within the complex texture at block 1948. At block 1950, the transformation operation that was performed in the complex texture is captured and made part of a complex transformation procedure. The complex transformation procedure is associated with the complex texture at block 1952.

At block 1954 it is determined if additional transformation operations related to the transformed source texture should be performed within the complex texture. If additional transformation is desired, the operation returns to block 1948 to perform and capture additional transformation operations. If no additional transformations of the source texture are desired, it is determined if additional source textures are needed to form the complex texture at block 1956. If additional source textures are needed, the operation returns to block 1914 of FIG. 19 to identify and select another source texture. If no additional source textures are needed, the complex texture may be associated with one or more surfaces of the three-dimensional electronic model at block 1958.

At block 1960, it is determined if additional surfaces of the three-dimensional electronic model need to be texturized. If additional surfaces need to be texturized, the three-dimensional electronic model and associated texturization is stored at block 1962. At block 1964, the file representative of the three-dimensional electronic model is available for export. If there are additional surfaces to texturize at block 1960, the operation returns to block 1914 of FIG. 19 to select additional source textures.

If at block 1946, no transformation of the complex texture is desired, the operation proceeds to block 1956 to determine if additional source textures are needed. If at block 1930 of FIG. 20, it is desired not to transform the selected source texture, it is determined if the source texture should be positioned in a complex texture at block 1966. If the source texture should be positioned in a complex texture, the operation proceeds to block 1938. If the source texture should not be positioned in a complex texture, the source texture is associated with one or more surfaces of the three-dimensional electronic model at block 1968 and the operation proceeds to block 1960 to determine if additional surfaces need texturized.

The discussed image generation system 100 may generate an electronic representation of a three-dimensional, texturized, colored, geometric model. The three-dimensional electronic model may be almost an electronic replica of an actual object, such as one or more buildings. The object may be scanned by the image generation system 100 to create a three-dimensional electronic image. Both an electronic geometric representation and the color of the object may be collected in each of a number of scans. The scans may be combined to form a three-dimensional electronic model using position data collected during each of the scans. The geometric surfaces of the three-dimensional model may be texturized by the image generation system 100 such that viewing a display of the electronic image may be similar to physically viewing the actual object.

While various embodiments of the invention have been described, it will be apparent to those of ordinary skill in the art that many more embodiments and implementations are possible that are within the scope of the invention. Accordingly, the invention is not to be restricted except in light of the attached claims and their equivalents.

What is claimed is:

1. An image generation system for developing three-dimensional electronic models of objects, the image generation system comprising:

a scanner operable to scan an object and provide scanner position data that includes a geographic position, slope and orientation of the scanner and image data representative of the object for each of a plurality of different geographic locations of the scanner in the vicinity of the object; and a computing system in communication with the scanner, where the computing system is operable to generate a three-dimensional electronic model of the object by fitting together the image data provided from each of the geographic locations based on the scanner position data.

2. The image generation system of claim 1, where the scanner includes a satellite positioning system and a slope orientation sensor operable to provide the scanner position data.

3. The image generation system of claim 2, where the slope orientation sensor is operable to provide a pitch, a roll and an orientation of the scanner.

4. The image generation system of claim 1, where the scanner includes a laser scanner operable to provide geometric point data representative of a geometric shape of the object.

5. The image generation system of claim 1, where the scanner includes a point scanner and a color scanner, the point scanner and the color scanner operable to synchronously provide image data representative of a geometric shape and a color of the object.

6. The image generation system of claim 1, where the scanner includes a point scanner operable to collect geometric point data representative of the geometric shape of the object, a color scanner operable to collect color point data representative of the color of the object and a positioning system operable to collect the scanner position data.

7. The image generation system of claim 6, where the computing system is operable to associate the color point data, the geometric point data, and the scanner position data to form a three-dimensional electronic image representative of only one scan of the object.

8. The image generation system of claim 7, where the computing system is operable to selectively combine a plurality of three-dimensional electronic images as a function of the scanner position data to generate a three-dimensional electronic model.

9. The image generation system of claim 1, where the scanner position data includes navigational coordinates, an elevation, a facing direction of the scanner and a pitch and a roll of the scanner.

10. An image generation system for developing three-dimensional electronic models of objects, the image generation system comprising:
a point scanner operable to generate a plurality of point clouds representative of an object as a function of a plurality of respective scans of the object from a plurality of respective geographic positions around the object;
a color scanner synchronously operating with the point scanner, where the color scanner is operable to generate color point data representative of the color of the object for each of the point clouds;
a positioning system operable to provide geographic position data of the point scanner and the color scanner for each of the geographic positions; and
a computing system operable to develop a three-dimensional electronic model as a function of the point clouds, the color point data and the geographic position data.

11. The image generation system of claim 10, where the color scanner is a line sensor operable to measure a line of color in a determined area of the object, while at the same time the point scanner is operable to measure distances from a plurality of points within the same determined area.

12. The image generation system of claim 10, where the each of the point clouds includes geometric point data generated by the point scanner and the computing system is operable to synchronously capture the color point data and geometric point data as image data.

13. The image generation system of claim 12, where the geometric point data includes a geometric point and the color point data includes a color point and the color point is associated with the geometric point in the point cloud.

14. The image generation system of claim 10, where the computing system includes a site computing system and a lab computing system, the site computing system is operable to perform a preliminary registration to form a preliminary three-dimensional electronic model, and the lab computing system is operable to perform precise registration of the preliminary three-dimensional electronic model to form a final three-dimensional electronic model.

15. The image generation system of claim 10, where the computing system includes a scan combining module and a geometric modeling module, the scan combining module operable to convert each of the point clouds to a plurality of lines that are exportable to the geometric modeling module, the geometric modeling module operable to form the three-dimensional electronic model from the lines.

16. The image generation system of claim 10, where the computing system is operable to develop a plurality of three-dimensional electronic images, each of the three-dimensional electronic images are developed as a function of one of the scans, where the three-dimensional electronic images are selectively combined to form the three-dimensional electronic model.

17. The image generation system of claim 16, where the computing system is operable to fill in gaps in color in a surface of each of the three-dimensional electronic images by division of the surface into triangles and color blending between color point data within each of the triangles.

18. The image generation system of claim 10, where the three-dimensional electronic model includes a simple layer, a construction layer, a position layer and a library layer.

19. The image generation system of claim 10, where the position system includes a satellite positioning system, a sensor configured to sense a facing direction and a sensor configured to sense a pitch and a roll of the sensor.

20. An image generation system for developing three-dimensional electronic models of objects, the image generation system comprising:
means for scanning an object, where the means for scanning is operable to determine position data that includes a geographic position, slope and orientation of the means for scanning an object and image data representative of the object for each of a plurality of different geographic locations of the means for scanning in the vicinity of the object; and
a computing system in communication with the means for scanning, where the computing system is operable to associate the position data with corresponding image data and dynamically fit together the image data from each of the different geographic locations based on the position data to generate a three-dimensional electronic model of the object.

21. The image generation system of claim 20, where the means for scanning includes means for determining navigational coordinates and means for determining slope, orientation and height of the means for scanning.

22. The image generation system of claim 20, where the computing system includes means for geometrically assembling the three-dimensional electronic model as a function of the navigational coordinates, the slope, orientation and height.

23. The image generation system of claim 20, where the computing system is configured to join a plurality of geometric points included in the image data, to form three-dimensional electronic images.

24. The image generation system of claim 23, where the computing system includes is configured to manipulate the three-dimensional electronic images.

25. The image generation system of claim 23, where the computing system is configured to combine the three-dimensional electronic images to form the three-dimensional electronic model.

26. The image generation system of claim 20, where the computing system includes is configured to texturize surfaces of the three-dimensional electronic model.

27. An image generation system for developing three-dimensional electronic models of objects, the image generation system comprising:
- a memory device;
- instructions in the memory device to store a plurality of three-dimensional electronic images, where each of the three-dimensional electronic images includes image data captured during a scan of an object
- instructions stored in the memory device to associate position data indicative of a geographic location and orientation of a scanner used to capture the image data with the image data captured from the perspective of that geographic location;
- instructions in the memory device to join a plurality of geometric points included in the image data of each of the three-dimensional electronic images; and
- instructions in the memory device to combine the three-dimensional electronic images to form a three-dimensional electronic model as a function of the position data.

28. The image generation system of claim 27, further comprising instructions in the memory device to texturize the three-dimensional electronic model.

29. The image generation system of claim 27, where the instructions in the memory device to join geometric points comprise instructions in the memory device to form surfaces within each of the three-dimensional electronic images.

30. The image generation system of claim 27, where the instructions in the memory device to join the geometric points comprise instructions in the memory device to partition each of the three-dimensional electronic images into sub-images.

31. The image generation system of claim 30, where the instructions in the memory device to join the geometric points comprise instructions in the memory device to develop a plurality of lines, where each of the lines is representative of one of the sub-images.

32. The image generation system of claim 31, where the instructions in the memory device to combine the three-dimensional electronic images comprise instructions in the memory device to position the lines with respect to each other.

33. The image generation system of claim 31, where the image data also includes color points and instructions in the memory device to develop a plurality of lines comprises instructions in the memory device to convert the geometric points and the color points to a line that replaces the geometric points and the color points.

34. The image generation system of claim 27, where the instructions in the memory device to combine the three-dimensional electronic images comprise instructions in the memory device to positionally manipulate the three-dimensional electronic images with respect to each other.

35. A method of developing a three-dimensional electronic model representative of an object, the method comprising:
- performing a scan of an object in each of a plurality of geographic positions with a scanner;
- collecting image data and corresponding geographic position data of the scanner during each scan with a computer;
- the computer developing a three-dimensional electronic image representative of each scan from the image data collected during the scan; and
- the computer combining a plurality of three-dimensional electronic images as a function of the geographic position data that is associated with each of the three-dimensional electronic images to form a three-dimensional electronic model representative of the object.

36. The method of claim 35, where performing a scan comprises determining geometric points representative of the geometric shape of the object.

37. The method of claim 35, where performing a scan comprises determining color point data in a line of color within an area while determining geometric point data within the same area.

38. The method of claim 35, where collecting image data and position data comprises synchronously collecting geometric point data and color point data representative of the object.

39. The method of claim 35, where collecting image data and position data comprises determining navigational coordinates, a facing direction, a pitch, a roll and a height of a scanner used to perform the scan.

40. The method of claim 35, where combining a plurality of three-dimensional electronic images comprises associating the image data with the position data.

41. The method of claim 35, where combining a plurality of three-dimensional electronic images comprises manipulating at least a portion of the three-dimensional electronic images with respect to each other.

42. The method of claim 35, further comprising selecting a source texture as a function of a texture of the object; developing a transformation procedure to create a complex texture from the source texture; and associating the transformation procedure with a surface of the three-dimensional electronic model.

43. The method of claim 35, where the object includes a symmetrical portion and developing a three-dimensional electronic image comprises mirroring the image data from a scanned portion of the object to the symmetrical portion of the object.

44. A method of developing a three-dimensional electronic model representative of an object, the method comprising:
- scanning an object with a scanner from a plurality of positions to develop a respective plurality of three-dimensional electronic images, where each of the three-dimensional electronic images is represented with a plurality of geometric points in a point cloud and a plurality of color points;
- portioning one of the three-dimensional electronic images into a plurality of sub-images;
- converting the geometric points and the color points into a plurality of lines representative of the respective sub-images; and
- combining the lines to develop a three-dimensional electronic model.

45. The method of claim 44, where converting the geometric points and the color points comprises storing the lines representative of the sub-images as an outline data file.

46. The method of claim 44, where scanning an object comprises scanning from a plurality of positions to generate a plurality of respective point clouds.

47. The method of claim 44, where combining the lines comprises manipulating the lines with respect to each other to precisely fit together.

48. The method of claim 44, where combining the lines comprises minimizing error in the distance between one of the lines and another of the lines.

49. The method of claim 44, further comprising compensating for height when the resting surface that the object rests upon is sloped.

50. The method of claim 44, further comprising filling gaps in color in the three-dimensional electronic model by rasterization.

51. The method of claim 44, further comprising dividing a surface of each of the three-dimensional electronic images into triangles and color blending within each of the triangles to fill gaps in color.

52. The method of claim 44, where converting the geometric points and the color points comprises replacing the geometric points and the color points with the lines that are representative of the geometric points and color points.

53. A method of developing a three-dimensional electronic model representative of an object, the method comprising:
  capturing a plurality of scans of an object with a scanner, where each of the scans includes image data representative of a three-dimensional electronic image and position data indicative of the position from which each scan was captured with the scanner;
  combining the scans to form a three-dimensional electronic model of the object as a function of the position data; and
  texturizing the three-dimensional electronic model as a function of a source texture that is an image file identified with a unique identifier and stored in a source texture library.

54. The method of claim 53, where texturizing comprises associating a texture with a surface of the three-dimensional electronic model.

55. The method of claim 53, where texturizing comprises selecting a source texture, creating a transformation procedure to transform the source texture to form a complex texture, and associating the transformation procedure with a surface of the three-dimensional electronic model.

56. The method of claim 53, further comprising organizing the three-dimensional electronic model into a structure that includes a plurality of layers.

57. The method of claim 53, where texturizing comprises searching the source texture library that includes a plurality of source textures, transforming a source texture to form a complex texture for a surface of the three-dimensional electronic model and storing in the library a transformation procedure to form the complex texture.

58. The method of claim 53, further comprising storing the three-dimensional electronic model as a datafile.

* * * * *

UNITED STATES PATENT AND TRADEMARK OFFICE
CERTIFICATE OF CORRECTION

PATENT NO. : 7,643,669 B2
APPLICATION NO. : 10/519252
DATED : January 5, 2010
INVENTOR(S) : Marek Strassenburg-Kleciak and Philipp Harald Nagel It is certified that error appears in the above-identified patent and that said Letters Patent is hereby corrected as shown below:

Col. 47, claim 24, Line 2, delete "includes"

Col. 47, claim 26, Line 9, delete "includes"

Signed and Sealed this

Sixteenth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,643,669 B2  Page 1 of 1
APPLICATION NO. : 10/519252
DATED : January 5, 2010
INVENTOR(S) : Strassenburg-Kleciak et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1013 days.

Signed and Sealed this

Sixteenth Day of November, 2010

David J. Kappos
*Director of the United States Patent and Trademark Office*